United States Patent
Hu et al.

(10) Patent No.: US 12,149,775 B2
(45) Date of Patent: Nov. 19, 2024

(54) POINTING REMOTE CONTROL METHOD AND SYSTEM

(71) Applicant: Huawei Technologies Co., Ltd., Shenzhen (CN)

(72) Inventors: Yubing Hu, Dongguan (CN); Kang Chung Liu, Shanghai (CN); Tao Jing, Shenzhen (CN); Liang Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 17/997,440

(22) PCT Filed: Apr. 23, 2021

(86) PCT No.: PCT/CN2021/089439
§ 371 (c)(1),
(2) Date: Oct. 28, 2022

(87) PCT Pub. No.: WO2021/218830
PCT Pub. Date: Nov. 4, 2021

(65) Prior Publication Data
US 2023/0232060 A1    Jul. 20, 2023

(30) Foreign Application Priority Data
Apr. 30, 2020   (CN) .......................... 202010365011.5

(51) Int. Cl.
*H04N 21/422*  (2011.01)
*H04N 21/426*  (2011.01)

(52) U.S. Cl.
CPC ..... *H04N 21/42221* (2013.01); *H04N 21/426* (2013.01)

(58) Field of Classification Search
CPC ........... H04N 21/42221; H04N 21/426; H04N 21/42204; H04N 21/42225; G06F 3/0304; G06F 3/0386; G06F 3/0308; G08C 23/04
See application file for complete search history.

(56) References Cited

U.S. PATENT DOCUMENTS

2005/0103924 A1    5/2005  Skala et al.
2008/0283731 A1*  11/2008  Karman ................ G06F 3/0386
                                                              250/208.6
(Continued)

FOREIGN PATENT DOCUMENTS

CN    101373557 B    8/2010
CN    101800866 A    8/2010
(Continued)

OTHER PUBLICATIONS

Akira Sakuraba, "Development of the Interactive Input Device for Large Desktop Space on Tiled Display Environment", Proceedings of the 72nd (2010) Annual Meeting (4), Interface Computer and Human Society, Information Processing Society of Japan, Mar. 8, 2010, pp. 4-107, 4-108.

*Primary Examiner* — John W Miller
*Assistant Examiner* — Omer Khalid
(74) *Attorney, Agent, or Firm* — Slater Matsil, LLP

(57) ABSTRACT

A remote control device sends a patterned infrared signal to the display device. A display device receives the patterned infrared signal by using a plurality of infrared receivers. The display device obtains a projection pattern of the patterned infrared signal on a display screen. The display device determines a pointing position of the remote control device on the display screen based on the projection pattern. The display device displays a prompt mark in the pointing position of the display screen, where the prompt mark is (Continued)

used to prompt a user with the pointing position of the remote control device on the display screen.

10 Claims, 34 Drawing Sheets

(56) References Cited

U.S. PATENT DOCUMENTS

| | | |
|---|---|---|
| 2011/0080340 A1 | 4/2011 | Campesi et al. |
| 2016/0239096 A1 | 8/2016 | Okuno et al. |

FOREIGN PATENT DOCUMENTS

| | | | |
|---|---|---|---|
| CN | 101939999 A | | 1/2011 |
| CN | 103702151 A | * | 4/2014 |
| CN | 104768042 A | * | 7/2015 |
| CN | 105607785 A | | 5/2016 |
| GB | 2408326 A | | 5/2005 |
| JP | 2018061667 A | | 4/2018 |
| KR | 20160126448 A | | 11/2016 |

\* cited by examiner

Straight-down backlight liquid crystal display (LCD)

Side-in backlight liquid crystal display (LCD)

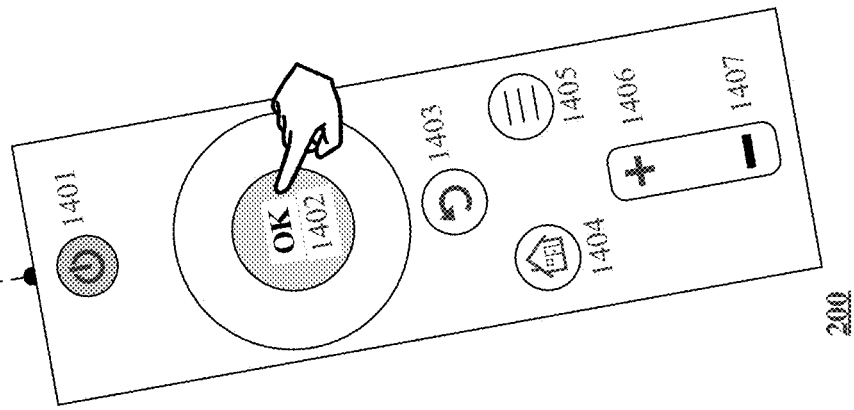

POINTING REMOTE CONTROL METHOD AND SYSTEM

CROSS-REFERENCE TO RELATED APPLICATIONS

This application is a National Stage of International Patent Application No. PCT/CN2021/089439 filed on Apr. 23, 2021, which claims priority to Chinese Patent Application No. 202010365011.5 filed on Apr. 30, 2020. Both of the aforementioned applications are hereby incorporated by reference in their entireties.

TECHNICAL FIELD

This application relates to the field of communication technologies, and in particular, to a pointing remote control method and system.

BACKGROUND

As a display device such as a television enters an intelligent era, a simplified design of a remote control has become consensus in the industry. The remote control has only buttons such as direction control, OK, back, volume+, volume−, and home. All operations can be implemented by cooperating with a user interface of an operating system on the display device.

Currently, a display device such as a television may display a user interface with an option icon, and display an option box, where the option box may be configured to indicate an option icon selected on the user interface. A user can use the remote control to move the option box by using a direction control key to an option icon that expects to be selected by the user. For a user interface with more option icons, such as a full keyboard input interface, the user needs to use a direction key for a long time and frequently on the remote control to select a desired option.

Therefore, when a display device such as a television is operated by using the foregoing remote control, operation steps are cumbersome.

SUMMARY

This application provides a pointing remote control method and system, so that a display device can identify a pointing position of a remote control device on a display screen of the display device by using a patterned infrared signal sent by the remote control device, to simplify an operation step.

According to a first aspect, this application provides a pointing remote control system, including a remote control device and a display device. The remote control device is configured to send a patterned infrared signal to the display device. The display device is configured to receive the patterned infrared signal by using a plurality of infrared receivers; and the display device is further configured to obtain a projection pattern of the patterned infrared signal on a display screen. The display device is further configured to determine a pointing position of the remote control device on the display screen based on the projection pattern. The display device is further configured to display a prompt mark in the pointing position of the display screen, where the prompt mark is used to prompt a user with the pointing position of the remote control device on the display screen. The display device includes the plurality of infrared receivers and the display screen.

In a possible implementation, the remote control device is further configured to receive a first input performed by the user on a first button; and in response to the first input, send control information corresponding to the first button to the display device. The display device is further configured to determine a first control operation based on the control information corresponding to the first button and the pointing position, and perform the first control operation.

In a possible implementation, the remote control device is specifically configured to: in response to the first input, send, by using the patterned infrared signal, the control information corresponding to the first button to the display device.

In a possible implementation, the remote control device is specifically configured to: in response to the first input, send, through Bluetooth, the control information corresponding to the first button to the display device.

In a possible implementation, the plurality of infrared receivers are arranged into an infrared receiver array, and the infrared receiver array is coupled to the display screen.

In a possible implementation, the plurality of infrared receivers are arranged around the display screen to form an infrared receiver frame.

In a possible implementation, the patterned infrared signal includes a circular infrared signal. The projection pattern includes a circular projection pattern or an oval projection pattern. The display device is specifically configured to determine, based on the circular projection pattern or the oval projection pattern of the received patterned infrared signal on the display screen, that a central position of the circular projection pattern or the oval projection pattern is the pointing position.

In a possible implementation, the patterned infrared signal includes a circular ring infrared signal. The projection pattern includes a circular ring projection pattern or an oval ring projection pattern, and energy in different rings in the circular ring infrared signal is different. The display device is specifically configured to: obtain positions of M receiving points covered by the circular ring projection pattern or the oval ring projection pattern on the infrared receiving array, where M is a positive integer; determine circular rings corresponding to the receiving points by using the positions of the receiving points as centers and using outer ring radiuses and inner ring radiuses that correspond to signal strength of the circular ring infrared signal received by the receiving points; and determine an overlapping area of M circular rings based on the circular rings respectively corresponding to the M receiving points, and determine a central position of the overlapping area as the pointing position.

In a possible implementation, the patterned infrared signal includes a cross-shaped infrared signal. The projection pattern includes a cross-shaped pattern. The display device is specifically configured to: obtain positions of four receiving points that receive the cross-shaped infrared signal and that are on the infrared receiving frame; determine the cross-shaped pattern of the patterned infrared signal on the display screen based on the positions of the four receiving points; and calculate a position of an intersection point in the cross-shaped pattern, and determine the position of the intersection point as the pointing position.

In a possible implementation, the first control operation includes any one of the following: a click to select operation, a touch and hold operation, a box select operation, and a drag operation.

In a possible implementation, the display device includes any one of the following device types: a display, a television, and a tablet computer. The remote control device includes any one of the following device types: a remote control, a mouse, and a smartphone.

This embodiment of this application provides a pointing remote control system. A display device may receive, by using an infrared receiver array or an infrared receiver frame, a patterned infrared signal sent by a remote control device. The display device may determine a pointing position of the remote control device on the display device based on a projection of the patterned infrared signal on the infrared receiver array or the infrared receiver frame. In this way, the display device may identify the pointing position of the remote control device on the display screen of the display device by using the patterned infrared signal sent by the remote control device, to simplify an operation step. In addition, a user may perform a touch type interactive operation (such as click to select, box select, touch and hold, and drag) on the display device by using the remote control device at a distance.

According to a second aspect, this application provides a display device, including a processor, a display screen, and a plurality of infrared receivers. The plurality of infrared receivers are configured to receive a patterned infrared signal sent by a remote control device. The processor is configured to obtain a projection pattern of the patterned infrared signal on the display screen. The processor is further configured to determine a pointing position of the remote control device on the display screen based on the projection pattern. The display screen is further configured to display a prompt mark in the pointing position of the display screen, where the prompt mark is used to prompt a user with the pointing position of the remote control device on the display screen.

In a possible implementation, the display device further includes a wireless communication module. The wireless communication module is configured to receive control information that corresponds to a first button and that is sent by the remote control device. The processor is further configured to determine a first control operation based on the control information corresponding to the first button and the pointing position. The processor is further configured to perform the first control operation.

In a possible implementation, the wireless communication module is specifically configured to receive the control information that corresponds to the first button and that is sent by the remote control device by using the patterned infrared signal.

In a possible implementation, the wireless communication module is specifically configured to receive the control information that corresponds to the first button and that is sent by the remote control device through Bluetooth.

In a possible implementation, the plurality of infrared receivers are arranged into an infrared receiver array, and the infrared receiver array is coupled to the display screen.

In a possible implementation, the plurality of infrared receivers are arranged around the display screen to form an infrared receiver frame.

In a possible implementation, the patterned infrared signal includes a circular infrared signal. The projection pattern includes a pattern projection or an oval projection pattern. The processor is specifically configured to determine, based on the circular projection pattern or the oval projection pattern of the received circular infrared signal on the display screen, that a central position of the circular projection pattern or the oval projection pattern is the pointing position.

In a possible implementation, the patterned infrared signal includes a circular ring infrared signal. The projection pattern includes a circular ring projection pattern or an oval ring projection pattern, and energy in different rings in the circular ring infrared signal is different. The processor is specifically configured to: obtain positions of M receiving points covered by the circular ring pattern or the oval ring projection pattern on the infrared receiving array, where M is a positive integer; determine circular rings corresponding to the receiving points by using the positions of the receiving points as circles and using outer ring radiuses and inner ring radiuses that correspond to signal strength of the circular ring infrared signal received by the receiving points; and determine an overlapping area of M circular rings based on the circular rings respectively corresponding to the M receiving points, and determine a central position of the overlapping area as the pointing position.

In a possible implementation, the patterned infrared signal includes a cross-shaped infrared signal. The projection pattern includes a cross-shaped pattern. The processor is specifically configured to: obtain positions of four receiving points that receive the cross-shaped infrared signal and that are on the infrared receiving frame; and determine the cross-shaped pattern of the patterned infrared signal on the display screen based on the positions of the four receiving points; and calculate a position of an intersection point in the cross-shaped pattern, and determine the position of the intersection point as the pointing position.

In a possible implementation, the first control operation includes any one of the following: a click to select operation, a touch and hold operation, a box select operation, and a drag operation.

In a possible implementation, the display device includes any one of the following device types: a display, a television, and a tablet computer. The remote control device includes any one of the following device types: a remote control, a mouse, and a smartphone.

This embodiment of this application provides a display device. The display device may receive, by using an infrared receiver array or an infrared receiver frame, a patterned infrared signal sent by a remote control device. The display device may determine a pointing position of the remote control device on the display device based on a projection of the patterned infrared signal on the infrared receiver array or the infrared receiver frame. In this way, the display device may identify the pointing position of the remote control device on the display screen of the display device by using the patterned infrared signal sent by the remote control device, to simplify an operation step. In addition, it is also convenient for a user to perform a touch type interactive operation (such as click to select, box select, touch and hold, and drag) on the display device by using the remote control device at a distance.

According to a third aspect, this application provides a pointing remote control method, including: First, a display device receives, by using a plurality of infrared receivers, a patterned infrared signal sent by a remote control device. Then, the display device obtains a projection pattern of the patterned infrared signal on a display screen, and then the display device determines a pointing position of the remote control device on the display screen based on the projection pattern. Next, the display device displays a prompt mark in the pointing position of the display screen, where the prompt mark is used to prompt a user with the pointing position of the remote control device on the display screen.

In a possible implementation, the method further includes: The display device receives control information that corresponds to a first button and that is sent by the remote control device. The display device determines a first control operation based on the control information corresponding to the first button and the pointing position. The display device performs the first control operation.

In a possible implementation, that the display device receives control information that corresponds to a first button and that is sent by the remote control device specifically includes: The display device receives the control information that corresponds to the first button and that is sent by the remote control device by using the patterned infrared signal.

In a possible implementation, that the display device receives control information that corresponds to a first button and that is sent by the remote control device specifically includes: The display device receives the control information that corresponds to the first button and that is sent by the remote control device through Bluetooth.

In a possible implementation, the plurality of infrared receivers are arranged into an infrared receiver array, and the infrared receiver array is coupled to the display screen.

In a possible implementation, the plurality of infrared receivers are arranged around the display screen to form an infrared receiver frame.

In a possible implementation, the patterned infrared signal includes a circular infrared signal. The projection pattern includes a pattern projection or an oval projection pattern. That the display device determines a pointing position of the remote control device on the display screen based on the projection pattern specifically includes: The display device determines, based on the circular projection pattern or the oval projection pattern of the received circular infrared signal on the display screen, that a central position of the circular projection pattern or the oval projection pattern is the pointing position.

In a possible implementation, the patterned infrared signal includes a circular ring infrared signal. The projection pattern includes a circular ring projection pattern or an oval ring projection pattern, and energy in different rings in the circular ring infrared signal is different. That the display device determines a pointing position of the remote control device on the display screen based on the projection pattern specifically includes: The display device determines the pointing position based on the circular ring projection pattern or the oval ring projection pattern and infrared signal receiving strength information in the projection pattern.

In a possible implementation, the patterned infrared signal includes a cross-shaped infrared signal. The projection pattern includes a cross-shaped pattern. That the display device obtains a projection pattern of the patterned infrared signal on the display screen specifically includes: The display device obtains positions of four receiving points that receive the cross-shaped infrared signal and that are on the infrared receiving frame; and the display device determines the cross-shaped pattern of the patterned infrared signal on the display screen based on the positions of the four receiving points. That the display device determines a pointing position of the remote control device on the display screen based on the projection pattern specifically includes: calculating a position of an intersection point in the cross-shaped pattern, and determining the position of the intersection point as the pointing position.

In a possible implementation, the first control operation includes any one of the following: a click to select operation, a touch and hold operation, a box select operation, and a drag operation.

In a possible implementation, the display device includes any one of the following device types: a display, a television, and a tablet computer. The remote control device includes any one of the following device types: a remote control, a mouse, and a smartphone.

This embodiment of this application provides a pointing remote control method. A display device may receive, by using an infrared receiver array or an infrared receiver frame, a patterned infrared signal sent by a remote control device. The display device may determine a pointing position of the remote control device on the display device based on a projection of the patterned infrared signal on the infrared receiver array or the infrared receiver frame. In this way, the display device may identify the pointing position of the remote control device on the display screen of the display device by using the patterned infrared signal sent by the remote control device, to simplify an operation step. In addition, it is also convenient for a user to perform a touch type interactive operation (such as click to select, box select, touch and hold, and drag) on the display device by using the remote control device at a distance.

According to a fourth aspect, this application provides a chip system, applied to a display device, where the chip system includes a processor. The display device includes a plurality of infrared receivers and a display screen. The processor is configured to: obtain a projection pattern of a patterned infrared signal on the display screen that is sent by a remote control device and that is received by the plurality of infrared receivers; determine a pointing position of the remote control device on the display screen based on the projection pattern; and indicate the display screen to display a prompt mark in the pointing position, where the prompt mark is used to prompt a user with the pointing position of the remote control device on the display screen.

In a possible implementation, a wireless communication module is further included. The wireless communication module is configured to receive control information that corresponds to a first button and that is sent by the remote control device. The processor is further configured to determine a first control operation based on the control information corresponding to the first button and the pointing position. The processor is further configured to perform the first control operation.

In a possible implementation, the wireless communication module is specifically configured to receive the control information that corresponds to the first button and that is sent by the remote control device by using the patterned infrared signal.

In a possible implementation, the wireless communication module is specifically configured to receive the control information that corresponds to the first button and that is sent by the remote control device through Bluetooth.

In a possible implementation, the patterned infrared signal includes a circular infrared signal. The projection pattern includes a pattern projection or an oval projection pattern. The plurality of infrared receivers are arranged into an infrared receiver array, and the infrared receiver array is coupled to the display screen. The processor is specifically configured to determine, based on the circular projection pattern or the oval projection pattern of the received circular infrared signal on the display screen, that a central position of the circular projection pattern or the oval projection pattern is the pointing position.

In a possible implementation, the patterned infrared signal includes a circular ring infrared signal. The projection pattern includes a circular ring projection pattern or an oval ring projection pattern, and energy in different rings in the circular ring infrared signal is different. The plurality of infrared receivers are arranged into an infrared receiver array, and the infrared receiver array is coupled to the display screen. The processor is specifically configured to: obtain positions of M receiving points covered by the circular ring projection pattern or the oval ring projection pattern on the infrared receiving array, where M is a positive integer; determine circular rings corresponding to the receiving points by using the positions of the receiving points as centers and using outer ring radiuses and inner ring radiuses that correspond to signal strength of the circular ring infrared signal received by the receiving points; and determine an overlapping area of M circular rings based on the circular rings respectively corresponding to the M receiving points, and determine a central position of the overlapping area as the pointing position.

In a possible implementation, the patterned infrared signal includes a cross-shaped infrared signal. The projection pattern includes a cross-shaped pattern. The plurality of infrared receivers are arranged around the display screen to form an infrared receiver frame. The processor is specifically configured to: obtain positions of four receiving points that receive the cross-shaped infrared signal and that are on the infrared receiving frame; and determine the cross-shaped pattern of the patterned infrared signal on the display screen based on the positions of the four receiving points; and calculate a position of an intersection point in the cross-shaped pattern, and determine the position of the intersection point as the pointing position.

In a possible implementation, the first control operation includes any one of the following: a click to select operation, a touch and hold operation, a box select operation, and a drag operation.

According to a fifth aspect, an embodiment of this application provides a display device, including one or more function units. The one or more function units are configured to perform the pointing remote control method in any one of the possible implementations of any of the foregoing aspects.

According to a sixth aspect, an embodiment of this application provides a computer storage medium, including computer instructions. When the computer instructions are run on a display device, the display device performs the pointing remote control method in any one of the possible implementations of any of the foregoing aspects.

According to a seventh aspect, an embodiment of this application provides a computer program product. When the computer program product is run on a computer, the computer performs the pointing remote control method in any one of the possible implementations of any of the foregoing aspects.

BRIEF DESCRIPTION OF THE DRAWINGS

FIG. 14A-1 and FIG. 14A-2 to FIG. 14F-1 and FIG. 14F-2 are a group of schematic diagrams of human-computer interaction operations according to an embodiment of this application.

DETAILED DESCRIPTION OF ILLUSTRATIVE EMBODIMENTS

Figure 1A:
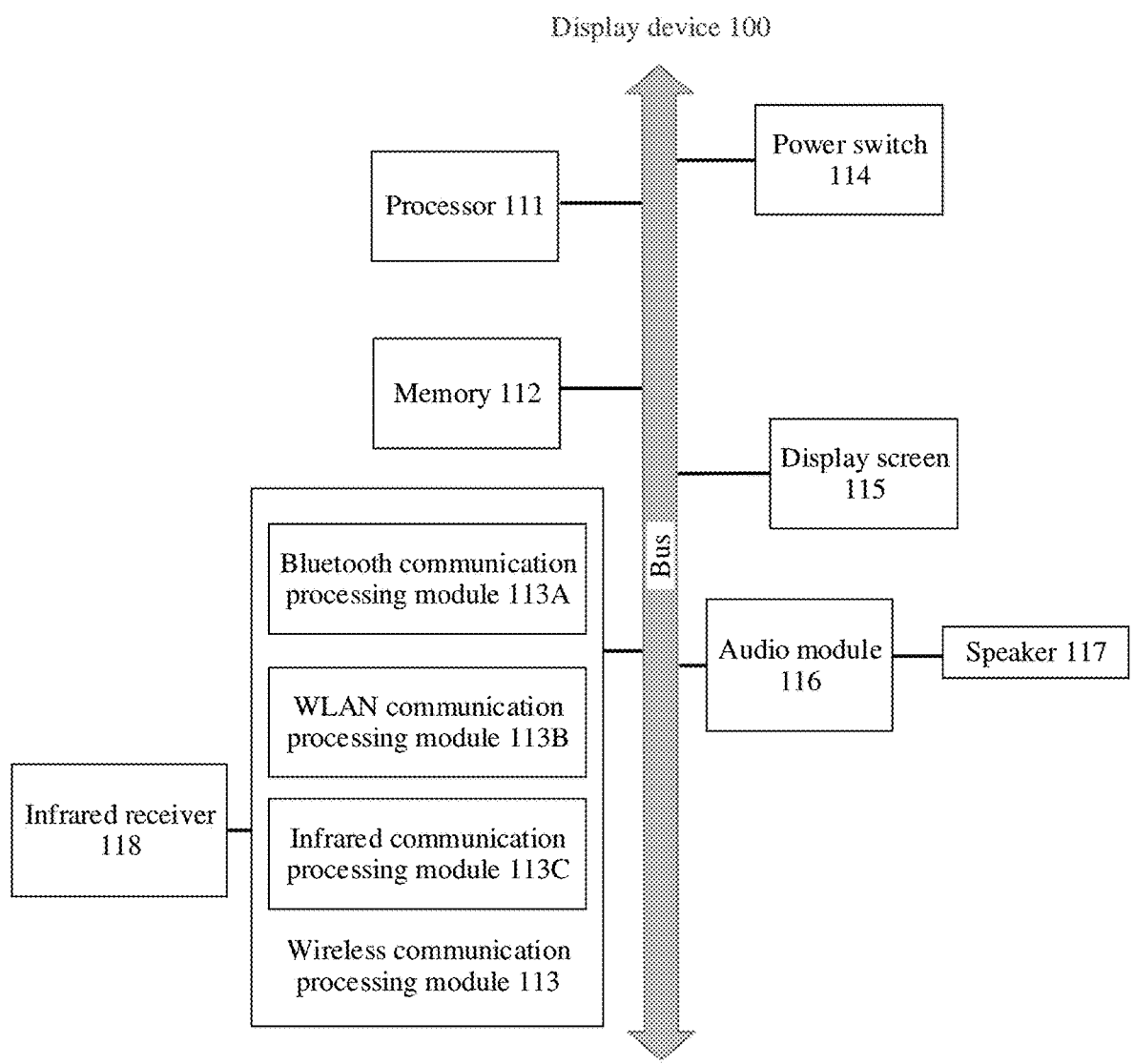
FIG. 1A is a schematic diagram of a hardware structure of a display device according to an embodiment of this application.

The following clearly and completely describes technical solutions in embodiments of this application with reference to the accompanying drawings. In the descriptions of embodiments of this application, unless otherwise stated, "/" indicates or, for example, A/B may indicate A or B. "And/or" in this specification merely describes an association relationship between associated objects, and indicates that three relationships may exist. For example, A and/or B may indicate that there are three cases: Only A exists, both A and B exist, and only B exists. In addition, in the descriptions of embodiments of this application, "a plurality of" means two or more.

The terms "first" and "second" mentioned below are merely intended for the purpose of description, and shall not be understood as an indication or implication of relative importance or implicit indication of a quantity of indicated technical features. Therefore, a feature defined by "first" or "second" may explicitly or implicitly include one or more features. In the descriptions of embodiments of this application, unless otherwise stated, "a plurality of" means two or more.

Currently, there is an air mouse that can be moved in the air. The air mouse may control a cursor on a screen of a display device by using data output by a sensor such as a gyroscope. A basic principle is as follows: The air mouse may map an angular velocity of an X-axis and an angular velocity of a Z-axis of the air mouse to a moving velocity of the air mouse, and calculate a moving position of the cursor on the screen of the display device by changing a relative position. During specific implementation, a digital processing chip of the air mouse converts a motion signal obtained by the sensor into a digital signal, and transmits a control signal to the display device by using radio frequency wireless communication. The display device then determines and displays a position of the cursor based on the control signal. Because the air mouse locates the cursor by using the motion data sensed by the sensor, the air mouse requires that an initial position of the cursor is displayed on the screen of the display device first, and then after a translation operation of slow movement of a user, determines a final position of the cursor based on a relative moving position of the translation operation. Therefore, cursor positioning precision is insufficient, and sometimes it takes the user a plurality of times to move the cursor to a specified position.

An embodiment of this application provides a pointing remote control method and system. A display device may receive, by using an infrared receiver array or an infrared receiver frame, a patterned infrared signal sent by a remote control device. The display device may determine a pointing position of the remote control device on the display device based on a projection of the patterned infrared signal on the infrared receiver array or the infrared receiver frame. In this way, the display device can identify the pointing position of the remote control device on the display screen of the display device by using the patterned infrared signal sent by the remote control device, to simplify an operation step. In addition, a user may perform a touch type interactive operation (such as click to select, box select, touch and hold, and drag) on the display device by using the remote control device at a distance.

The following describes a display device loo according to an embodiment of this application.

FIG. 1A is a schematic diagram of a structure of the display device 100.

As shown in FIG. 1A, the display device 100 may include a processor 111, a memory 112, a wireless communication processing module 113, a power switch 114, a display screen 115, an audio module 116, a speaker 117, and an infrared receiver 118.

The processor 111 may include one or more processing units. For example, the processor 111 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the display device 100. The controller may generate an operation control signal based on an instruction operation code and a time sequence signal, to complete control of instruction fetching and instruction execution.

A memory may be further disposed in the processor 111, and is configured to store instructions and data. In some embodiments, the memory in the processor 111 is a cache. The memory may store instructions or data just used or cyclically used by the processor 111. If the processor 111 needs to use the instructions or the data again, the processor may directly invoke the instructions or the data from the memory. This avoids repeated access, reduces waiting time of the processor 111, and improves system efficiency.

The memory 112 is coupled to the processor 111, and is configured to store various software programs and/or a plurality of groups of instructions. The memory 112 may be configured to store computer-executable program code. The executable program code includes instructions. The processor 111 implements various function applications of the display device 100 and data processing by running the instructions stored in the memory 112. The memory 112 may include a program storage area and a data storage area. The program storage area may store an operating system, an application required by at least one function (for example, a sound playing function or an image playing function), and the like. The data storage area may store data (such as audio data and to-be-displayed image data) created during use of the display device 100. In addition, the memory 112 may include a high-speed random access memory, and may further include a nonvolatile memory, for example, at least one magnetic disk storage device, a flash memory device, or a universal flash storage (universal flash storage, UFS).

The wireless communication module 113 may provide a wireless communication solution that is applied to the display device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

In some embodiments, the wireless communication processing module 113 may include a Bluetooth (BT) communication processing module 113A, a WLAN communication processing module 113B, and an infrared communication processing module 113C. One or more of the Bluetooth (BT) communication processing module 113A and the WLAN communication processing module 113B may monitor a signal transmitted by another device, such as a probe request or a scan signal, and may send a response signal, such as a probe response or a scan response, so that the another device can discover the display device 100, and the display device 100 establishes a wireless communication connection with the another device, and communicates with the another device by using one or more wireless communication technologies in Bluetooth or WLAN. The Bluetooth (BT) communication processing module 113A may provide a solution that includes one or more Bluetooth communication in classic Bluetooth (BR/EDR) or Bluetooth low energy (Bluetooth low energy, BLE). The WLAN communication processing module 113B may include one or more WLAN communication solutions in Wi-Fi direct, Wi-Fi LAN, or Wi-Fi SoftAP. The infrared communication processing module 113C may process an infrared signal received by the infrared receiver 118 and a position for receiving the infrared signal.

The power switch 114 may be configured to control a power supply to supply power to the display device 100. In some embodiments, the power switch 114 may be configured to control an external power supply to supply power to the display device 100.

In some embodiments, the display device 100 may further include a battery, a charging management module, and a power management module. The battery may be configured to provide power for the display device 100. The charging management module is configured to receive a charging input from a charger. The charger may be a wireless charger or a wired charger. In some embodiments of wired charging, the charging management module may receive a charging input from the wired charger through a USB port. In some embodiments of wireless charging, the charging management module may receive a wireless charging input through a wireless charging coil of the display device 100. When the charging management module charges the battery, the power management module may further supply power to an electronic device. The power management module is configured to connect to the battery, the charging management module, and the processor 111. The power management module receives an input from the battery and/or the charging management module, and supplies power to the processor 111, the memory 112, the display screen 115, the wireless communication processing module 113, and the like. The power management module may be further configured to monitor parameters such as a battery capacity, a battery cycle count, and a battery health status (electric leakage or impedance). In some other embodiments, the power management module may alternatively be disposed in the processor 111. In some other embodiments, the power management module and the charging management module may alternatively be disposed in a same device.

The display screen 115 may be configured to display an image, a video, or the like. The display screen 115 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like.

The infrared receiver 118 may be configured to receive an infrared signal. For example, the infrared receiver 118 may receive a patterned infrared signal sent by a remote control device, such as a circular infrared signal, a circular ring infrared signal, and a cross-shaped infrared signal. It should be noted that a pattern may mean that several spatial shapes can be obtained through division by using an outline in a two-dimensional space.

Figure 1B:
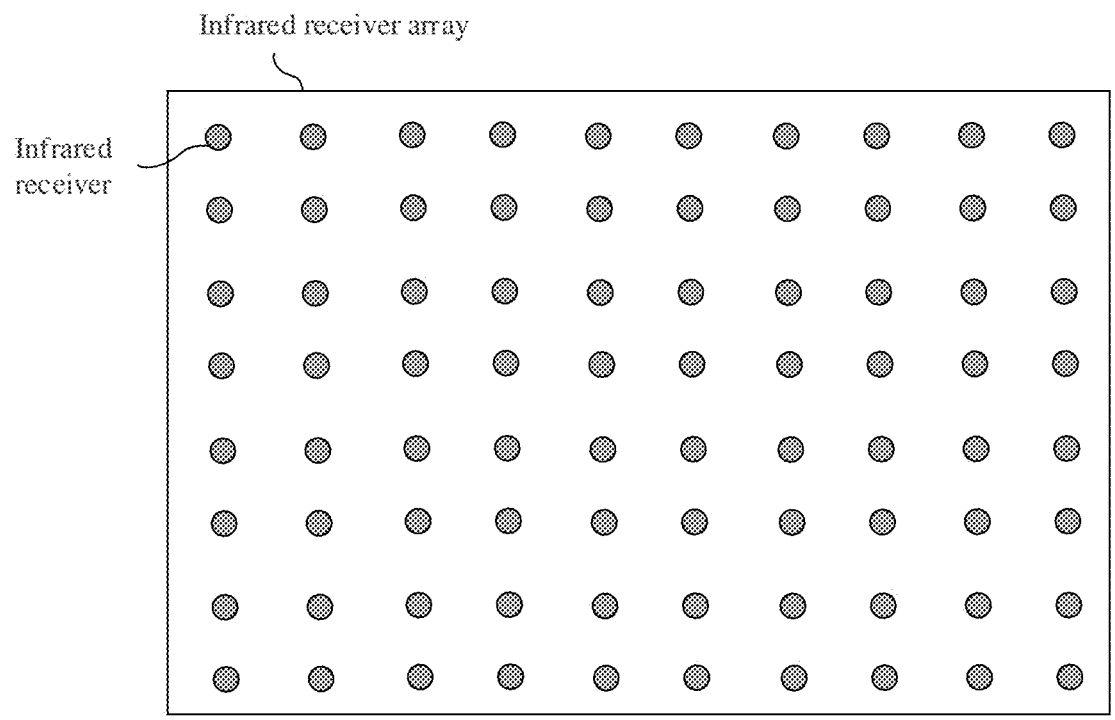
FIG. 1B is a schematic diagram of a structure of an infrared receiver array according to an embodiment of this application.

In this embodiment of this application, the display device 100 includes a plurality of infrared receivers 118. As shown in FIG. 1B, the plurality of infrared receivers 118 may be arranged into an infrared receiver array in a matrix form.

Figure 1C:
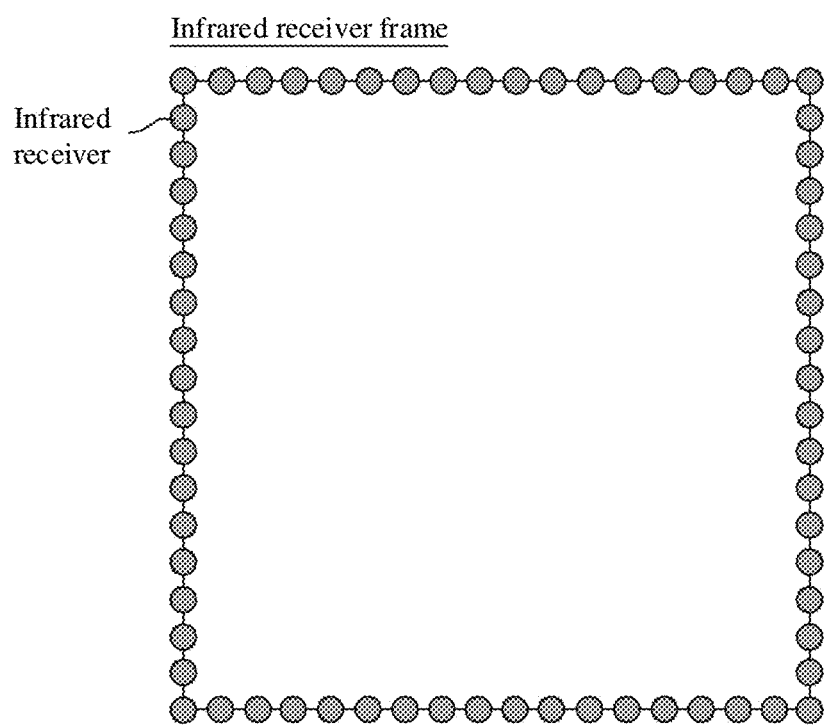
FIG. 1C is a schematic diagram of a structure of an infrared receiver frame according to an embodiment of this application.

In some other embodiments, as shown in FIG. 1C, the plurality of infrared receivers 118 may be arranged on a frame around the display screen 115. In this embodiment of this application, the plurality of infrared receivers 118 arranged on the frame around the display screen 115 may be referred to as an infrared receiver frame. In a possible implementation, when the display device 100 is a projector, the plurality of infrared receivers 118 are arranged around a projection screen as an infrared receiver frame of the projection screen.

In this embodiment of this application, when the display device 100 includes an infrared receiver array, the infrared receiver array may be coupled to the display screen 115.

Figure 1D:
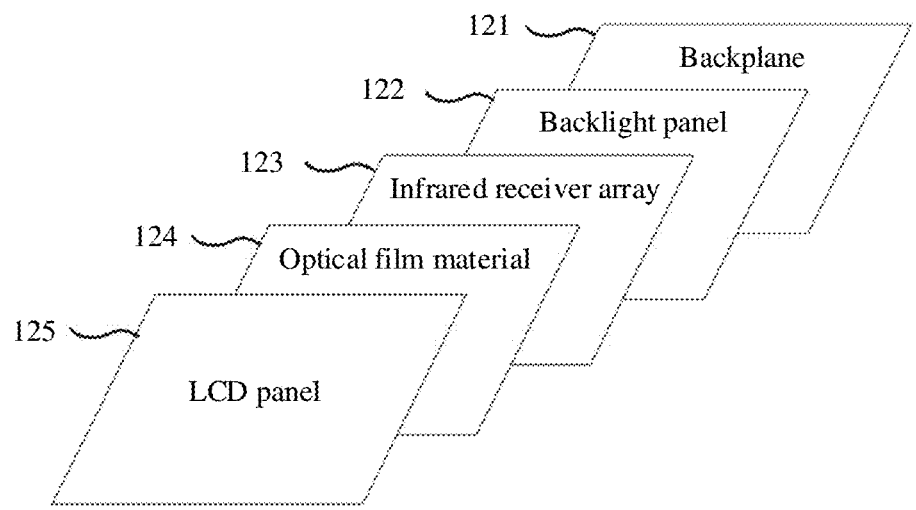
FIG. 1D is a schematic diagram of a structure of a straight-down backlight liquid crystal display according to an embodiment of this application.

For example, as shown in FIG. 1D, the display screen 115 may be a straight-down backlight liquid crystal display. The straight-down liquid crystal display may include a backplane 121, a backlight panel 122, an optical film material 124, and an LCD panel 125. An infrared receiver array 122 may be located between the backlight panel 122 and the optical film material 124. The backplane 121 may be configured to support the entire straight-down liquid crystal display. The backlight panel 122 may be configured to emit light and provide a light source for the LCD panel 125. The optical film material 124 may be configured to: excite generation of a light source with a plurality of different colored light by using light with a single color emitted by the backlight panel 122, and mix the different colored light with each other to form white light as a backlight source of the LCD panel. The LCD panel 125 may change a display color and brightness of each pixel on the display screen 115 under control of an electrical signal.

Figure 1E:
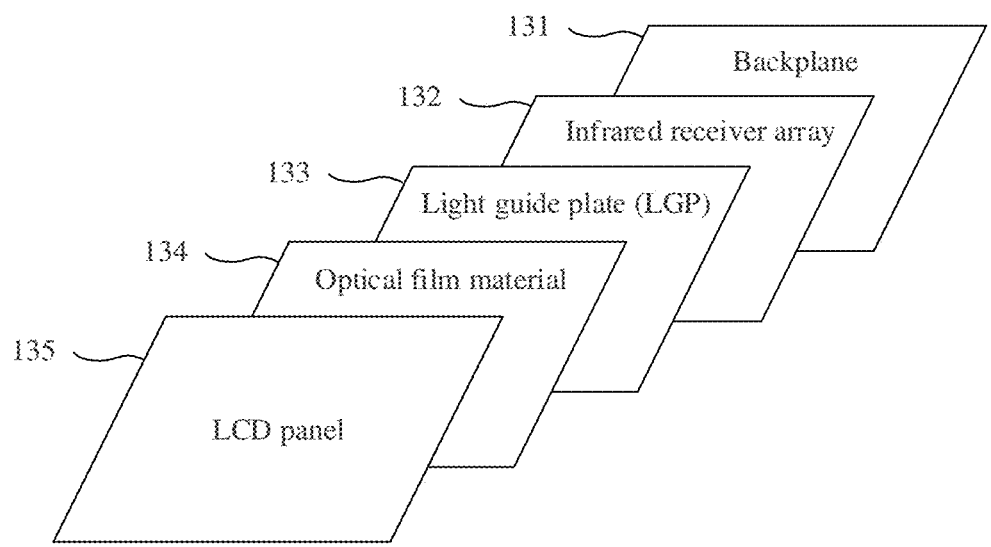
FIG. 1E is a schematic diagram of a structure of a side-in backlight liquid crystal display according to an embodiment of this application.

As shown in FIG. 1E, the display screen 115 may be a side-in backlight liquid crystal display. The side-in liquid crystal display may include a backplane 131, a light guide plate (LGP) 133, an optical film material 134, and an LCD panel 135. An infrared receiver array 132 may be located between the backplane 131 and the light guide plate 133. The backplane 131 may be configured to support the entire side-in liquid crystal display. The light guide plate 133 may be configured to adjust light emitted by an LED light bar distributed on a side of the display screen 115 to be incident into the LCD panel 135 from a specified direction. The optical film material 134 may be configured to: excite generation of a light source with a plurality of different colored light by using light with a single color emitted by the backlight panel 132, and mix the different colored light with each other to form white light as a backlight source of the LCD panel. The LCD panel 135 may change a display color and brightness of each pixel on the display screen 115 under control of an electrical signal.

Figure 1F:
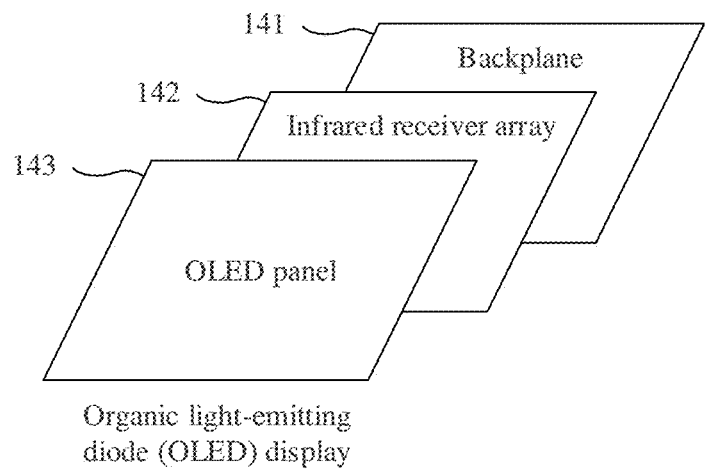
FIG. 1F is a schematic diagram of a structure of an organic light emitting diode display screen according to an embodiment of this application.

As shown in FIG. 1F, the display screen 115 may be a self-luminous display screen, for example, an OLED display. The OLED display includes a backplane 141 and an OLED panel 143. An infrared receiver array 142 may be located between the backplane 141 and the OLED panel 143. The backplane 141 may be configured to support the entire OLED display. The OLED panel 143 may include several self-luminous sub-pixels, and each sub-pixel can be separately lit. Because organic material molecules in sub-pixels are different, there may be three types of sub-pixels for generating three primary colors red, green, and blue (RGB), or four types of sub-pixels for generating four colors red, green, blue, and white (RGBW). Each pixel on the OLED display may include sub-pixels of three primary colors red, green, and blue (RGB), so that each pixel can display a different color. Alternatively, each pixel on the OLED display may include sub-pixels of four colors red, green, blue, and white (RGBW), so that each pixel can display a different color.

Figure 1G:
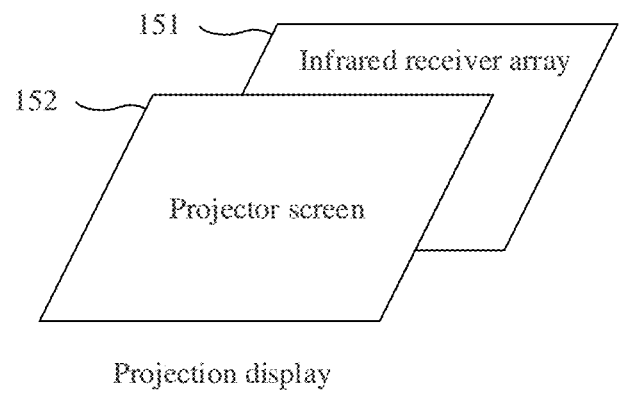
FIG. 1G is a schematic diagram of a position of a projection screen and an infrared receiver array during projection display according to an embodiment of this application.

In some embodiments, the display device 100 may be a projection device such as a projector. As shown in FIG. 1G, the display screen 115 of the display device 100 may be a projection screen 152. An infrared receiver array 151 may be behind the projection screen 152.

The audio module 116 may be configured to convert a digital audio signal into an analog audio signal output, and may also be configured to convert an analog audio input into a digital audio signal. The audio module 116 may be further configured to: code and decode an audio signal. In some embodiments, the audio module 116 may be disposed in the processor 111, or some functional modules of the audio module 116 are disposed in the processor 111. The audio module 116 may transmit an audio signal to the wireless communication module 113 by using a bus interface (for example, a UART interface), so as to implement a function of playing an audio signal by using a Bluetooth speaker.

The speaker 117 may be configured to convert an audio signal sent by the audio module 116 into an acoustical signal.

In some embodiments, the display device 100 may further include a microphone, also referred to as a "mic" or a "mike", and is configured to convert an acoustical signal into an electrical signal. When a voice control instruction occurs, a user may produce sound by using a mouth, and input an acoustical signal to the microphone.

In some embodiments, the display device 100 may further include a wired local area network (local area network, LAN) communication processing module, a high definition multimedia interface (high definition multimedia interface, HDMI) communication processing module, and a universal serial bus (universal serial bus, USB) communication processing module. The wired LAN communication processing module may be configured to communicate with another device in a LAN by using a wired LAN, and may be further configured to connect to a WAN by using a wired LAN, so as to communicate with a device in the WAN. The HDMI communication processing module may be configured to communicate with another device by using an HDMI interface. For example, the HDMI communication processing module may receive, by using the HDMI interface, HDR video data sent by a set top box, and the like. The USB communication processing module may be configured to communicate with another device through a USB port.

In this embodiment of this application, the display device 100 may be any one of the following device types: a display, a television, a personal computer, a tablet computer, a projector, and the like. It should be noted that when the display device 100 is a projector, the display screen of the display device 100 may be a projection screen.

The following describes a remote control device according to an embodiment of this application.

Figure 2:
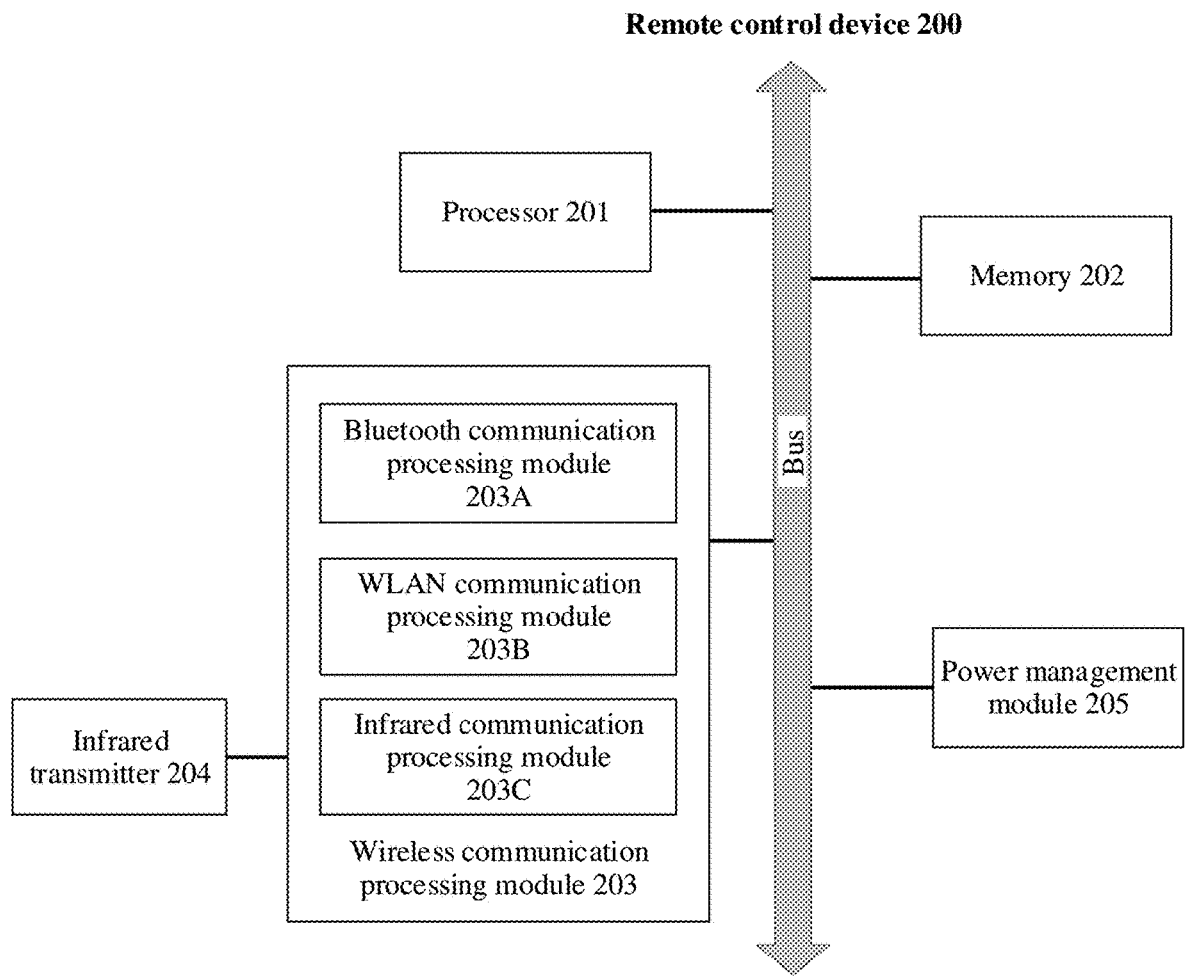
FIG. 2 is a schematic diagram of a hardware structure of a remote control device according to an embodiment of this application.

FIG. 2 is a schematic diagram of a structure of a remote control device 200.

As shown in FIG. 2, the remote control device 200 may include a processor 201, a memory 202, a wireless communication processing module 203, an infrared transmitter 204, a power management module 205, and the like.

The processor 201 may be configured to read and perform a computer readable instruction. During specific implementation, the processor 201 may mainly include a controller, an arithmetic unit, and a register. The controller is mainly responsible for instruction decoding; and sending a control signal to an operation corresponding to an instruction. The arithmetic unit is mainly responsible for saving a quantity of register operations, intermediate operation results, and the like that are temporarily stored during instruction execution. During specific implementation, a hardware architecture of the processor 201 may be an application-specific integrated circuit (ASIC) architecture, an MIPS architecture, an ARM architecture, an NP architecture, or the like.

In some embodiments, the processor 201 may be configured to parse a signal received by the wireless communication processing module 203, such as a Bluetooth signal sent by the display device 100.

In some embodiments, the processor 201 may be further configured to generate a signal sent from the wireless communication processing module 203, such as a Bluetooth broadcast signal and an infrared signal with control information.

The memory 202 is coupled to the processor 201 and configured to store various software programs and/or a plurality of groups of instructions. During specific implementation, the memory 202 may include a high-speed random access memory, and may also include a non-volatile memory. The memory 202 may store a communication program, and the communication program may be configured to communicate with the display device 100.

The wireless communication processing module 203 may include an infrared communication processing module 203C. In some embodiments, the wireless communication processing module 203 may further include one or more of a Bluetooth communication processing module 203A and a WLAN communication processing module 203B.

One or more of the Bluetooth communication processing module 203A and the WLAN communication processing module 203B may monitor a signal transmitted by another device (such as the display device 100), such as a probe request or a scan signal, and may send a response signal, such as a probe response or a scan response, so that the another device (such as the display device 100) can discover the remote control device 200 and establish a wireless communication connection. The Bluetooth communication processing module 203 may provide a solution that includes one or more Bluetooth communication in classic Bluetooth or Bluetooth low energy (Bluetooth low energy, BLE). The WLAN communication processing module 203B may include one or more WLAN communication solutions in Wi-Fi direct, Wi-Fi LAN, or Wi-Fi SoftAP. The infrared communication processing module 203C may modulate an infrared signal with control information, and send the infrared signal with control information by using the infrared transmitter 204.

The infrared transmitter 204 may be an infrared light emitting diode, configured to radiate an infrared signal outward. In some embodiments, the remote control device 200 may include a plurality of infrared transmitters 204.

The power management module 205 may be configured to connect to a battery (not shown), a charging management module (not shown), and the processor 201. The power management module 205 receives an input from the battery (not shown) and/or the charging management module (not shown), and supplies power to the processor 201, the memory 202, the wireless communication processing module 203, the infrared transmitter 204, and the like. The power management module 205 may be further configured to monitor parameters such as a battery capacity, a battery cycle count, and a battery health status (electric leakage or impedance).

The remote control device 200 may further include one or more buttons (for example, an OK button, a home button, a volume+ button, a volume− button, a channel+ button, and a channel− button), where the one or more buttons may be physical buttons. In some embodiments, the remote control device 200 may further include a touchscreen, and the one or more buttons may be virtual buttons displayed on the touchscreen.

In this embodiment of this application, the remote control device 200 further includes one or more microlens structures (not shown in the figure). The one or more microlens structures may be disposed in a light emitting direction of the infrared transmitter 204. The infrared transmitter 204 can cooperate with the microlens structure to output an infrared signal of a specified pattern with specific energy distribution.

Figure 3A:
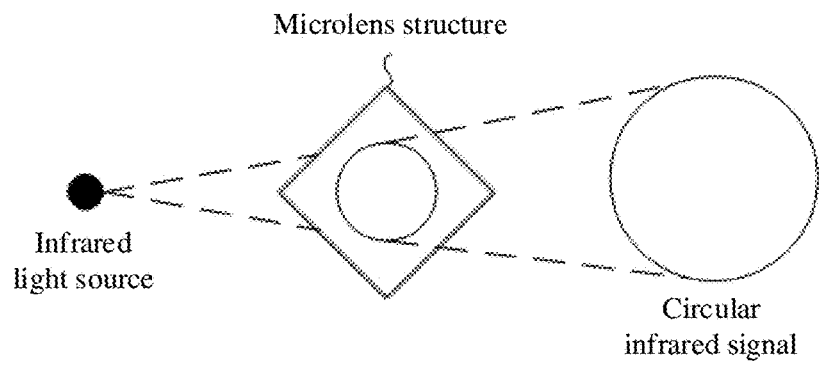
FIG. 3A is a schematic diagram of a principle of generating a circular infrared signal according to an embodiment of this application.

For example, as shown in FIG. 3A, the infrared transmitter 204 may be used as an infrared light source to emit an infrared signal. After the infrared signal passes through the microlens structure, a circular infrared signal may be formed. Energy distribution of the infrared signal is uniform in the circular pattern.

Figure 3B:
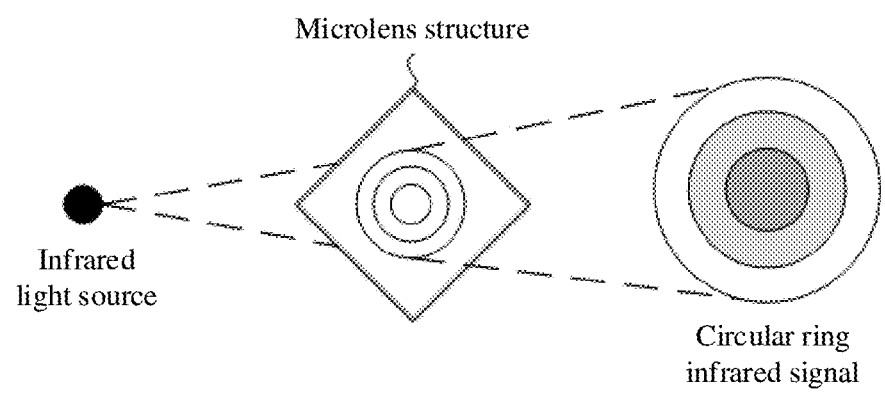
FIG. 3B is a schematic diagram of a principle of generating a circular ring infrared signal according to an embodiment of this application.

As shown in FIG. 3B, the infrared transmitter 204 may be used as an infrared light source to emit an infrared signal. After the infrared signal passes through the microlens structure, a circular ring infrared signal with specified energy distribution may be formed. For example, innermost ring energy of the circular ring infrared signal is the highest, and energy is lower in a further outer circular ring.

Figure 3C:
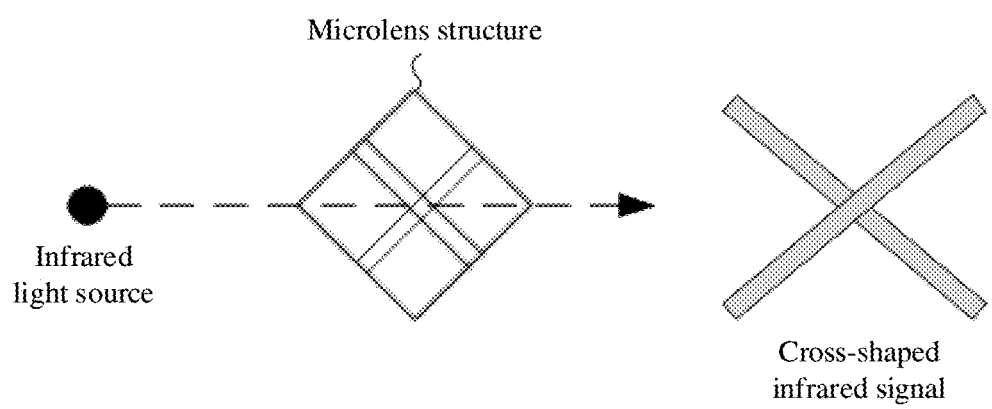
FIG. 3C is a schematic diagram of a principle of generating a cross-shaped infrared signal according to an embodiment of this application.

As shown in FIG. 3C, the infrared transmitter 204 may be used as an infrared light source to emit an infrared signal. After the infrared signal passes through the microlens structure, a cross-shaped infrared signal may be formed. Energy distribution of the infrared signal is uniform in the cross-shaped pattern.

In a possible implementation, the remote control device 200 may output an infrared signal of a specified pattern with specified energy distribution by using a plurality of infrared transmitters 204 and a plurality of microlens structures.

Figure 3D:
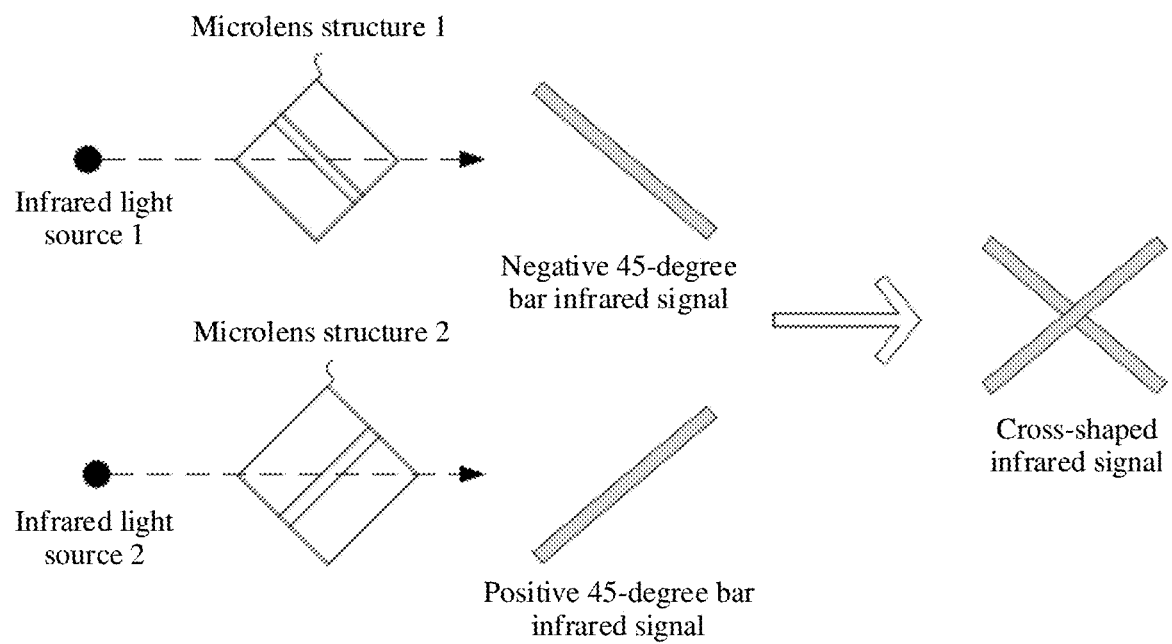
FIG. 3D is a schematic diagram of a principle of generating another cross-shaped infrared signal according to an embodiment of this application.

For example, as shown in FIG. 3D, the remote control device 200 may include two infrared transmitters 204 and two microlens structures (a microlens structure 1 and a microlens structure 2). The two infrared transmitters 204 may respectively serve as two infrared light sources (an infrared light source 1 and an infrared light source 2) to emit an infrared signal. After an infrared signal sent by the infrared light source 1 passes through the microlens structure, a negative 45-degree bar infrared signal may be formed. After an infrared signal sent by the infrared light source 2 passes through the microlens structure, a positive 45-degree bar infrared signal may be formed. The negative 45-degree bar infrared signal may intersect the positive 45-degree bar infrared signal to form a cross-shaped infrared signal. The foregoing example shown in FIG. 3D is merely used to describe this application, and is not intended to constitute a limitation. During specific implementation, an intersection angle of two bar patterns of a cross-shaped pattern may be another angle, which is not limited herein.

In this embodiment of this application, when a plurality of infrared receivers 118 on the display device 100 are arranged into an infrared receiver array in a matrix form and are coupled to the display screen 115, the remote control device 200 may use a microlens structure and an infrared transmitter that output an infrared signal of any one of the following patterns: an infrared signal of a circular pattern, an infrared signal of a circular ring pattern, an infrared signal of a cross-shaped pattern, an infrared signal of a square ring pattern, an infrared signal of an H-shaped pattern, and the like. When the plurality of infrared receivers 118 on the display device 100 are arranged into an infrared receiving frame around the display screen 115, the remote control device 200 may use a microlens structure and an infrared transmitter that output an infrared signal of a pattern such as a cross-shaped pattern.

In this embodiment of this application, the remote control device 200 may be any one of the following device types: a remote control (for example, a television remote control), a mouse, a smartphone, a tablet computer, and the like. It should be noted that when the remote control device 200 is an apparatus with a touchscreen such as a smartphone or a tablet computer, one or more buttons on the remote control device 200 may be virtual buttons displayed on the touchscreen.

The following describes a pointing remote control system according to an embodiment of this application.

Figure 4:
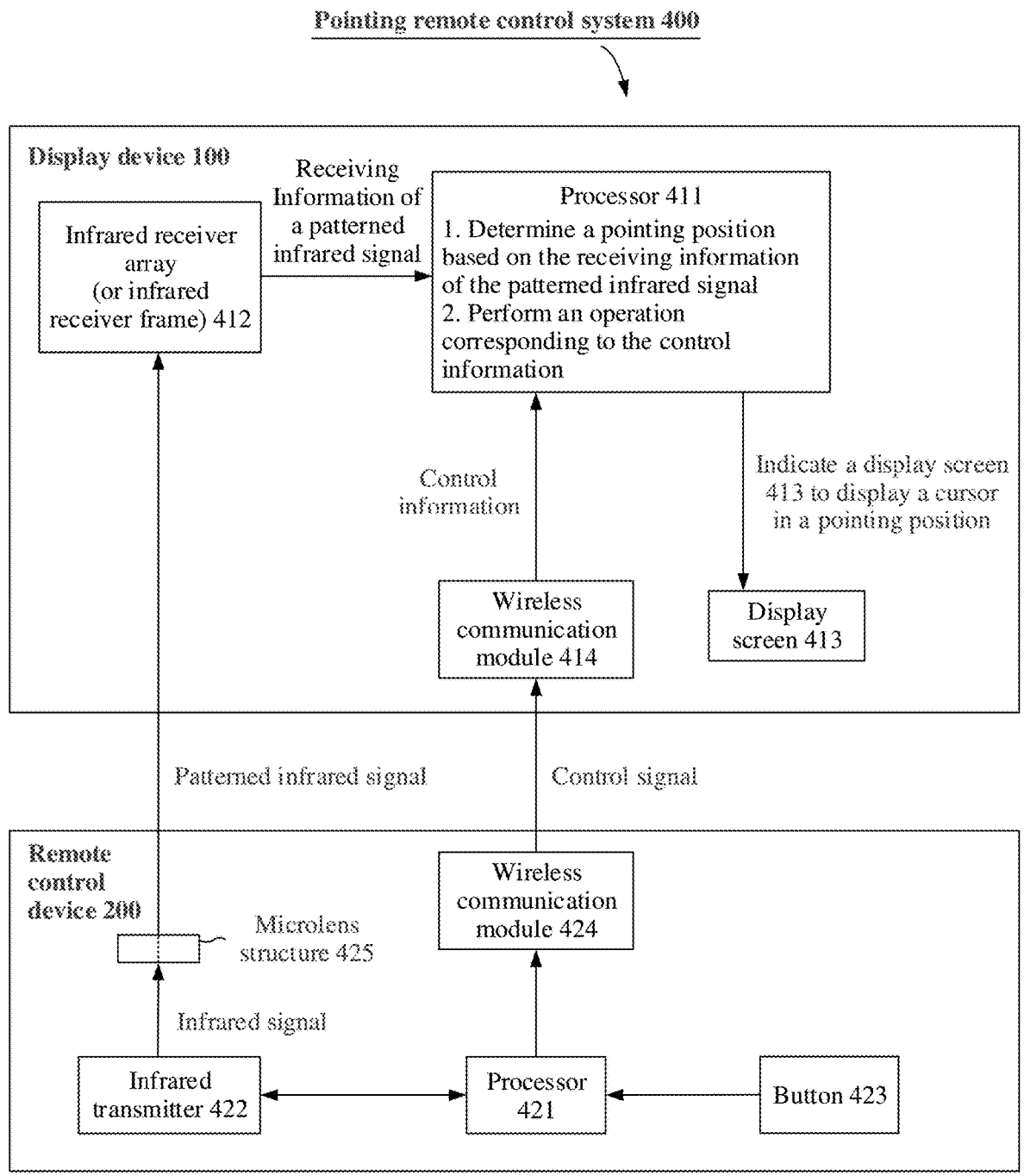
FIG. 4 is a schematic diagram of an architecture of a pointing remote control system according to an embodiment of this application.

FIG. 4 is a schematic diagram of a framework of a pointing remote control system 400 according to an embodiment of this application.

As shown in FIG. 4, the pointing remote control system 400 may include a display device 100 and a remote control device 200. The display device 100 may include a processor 411, an infrared receiver array (or an infrared receiver frame) 412, a display screen 413, and a wireless communication module 414. The processor 411 may be a microcontroller unit (microcontroller unit, MCU). The wireless communication module 414 may include a 2.4 G radio frequency transmission module (for example, a Bluetooth transmission module and an infrared transmission module). In a possible implementation, the wireless communication module 414 may include a Wi-Fi transmission module. For specific descriptions of the display device 100, refer to the foregoing embodiment in FIG. 1A. Details are not described herein again.

The remote control device 200 may include a processor 421, an infrared transmitter 422, a button 423, and a wireless communication module 424. The processor 421 may be a microcontroller unit (microcontroller unit, MCU). The infrared transmitter 422 may send an infrared signal of a specified pattern in combination with a microlens structure. There may be one or more buttons 423. The button 423 may be a physical button or a virtual button. The wireless communication module 424 may include a 2.4 G radio frequency transmission module (for example, a Bluetooth transmission module and an infrared transmission module). The wireless communication module 424 may send control information corresponding to the button 423 to the display device 100 by using a control signal. In a possible implementation, the wireless communication module 414 may include a Wi-Fi transmission module. For specific descriptions of the remote control device 200, refer to the foregoing embodiment in FIG. 2. Details are not described herein again.

With reference to the pointing remote control system 400, the following specifically describes a working process of hardware on the display device 100 and hardware on the remote control device 200.

The infrared transmitter 422 may send a patterned infrared signal with specified energy distribution to the infrared receiver array (or the infrared receiver frame) 412 by using a microlens structure 425. Due to different microlens structures 425, a patterned infrared signal may project patterns of different shapes, such as a circular pattern, a circular ring pattern, and a cross-shaped pattern, on a facing projection plane. When the patterned infrared signal is projected laterally onto the projection plane, a projection pattern on the projection plane may be an oval pattern, an oval ring pattern, a cross-shaped pattern, or the like.

After receiving the patterned infrared signal, the infrared receiver array (or the infrared receiver frame) 412 may report receiving information of the patterned infrared signal to the processor 411, where the receiving information may include position information of the patterned infrared signal. In some embodiments, the receiving information may include position information of the received patterned infrared signal and received signal strength information of the patterned infrared signal.

The processor 411 may determine a pointing position of the remote control device 200 based on the receiving information of the infrared signal, and give the pointing position to the display screen 413. The display screen 413 may display a cursor in the pointing position. The cursor may be used to prompt a user with a fact that the remote control device 200 points to a position of the cursor on the display screen 413. For a process of determining the pointing position of the remote control device 200, refer to a subsequent embodiment. Details are not described herein.

The processor 421 may detect an operation (for example, press, touch and hold, click, or double-click) of a user by using the button 423. In response to the operation, the processor 421 may match a corresponding control instruction of the button 423. The processor 421 may instruct, based on the control instruction, the wireless communication module 424 to send a control signal to the wireless communication module 414. The wireless communication module 414 may parse out control information from the control signal and send the control information to the processor 411. The processor 411 may perform an operation corresponding to the control information.

Figure 5A:
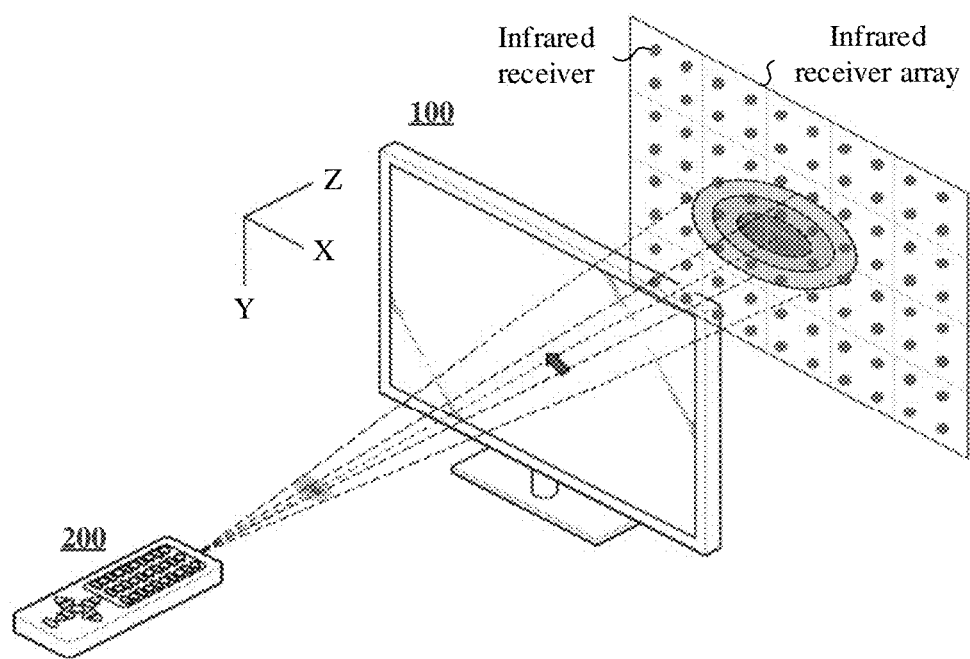
FIG. 5A is a schematic diagram of an application scenario of an infrared receiving array according to an embodiment of this application.

For example, as shown in FIG. 5A, the infrared receiver array on the display device 100 may include a plurality of infrared receivers arranged in a rectangular array. The infrared receiver array may be coupled to the display screen 413. The infrared transmitter 422 may send a patterned infrared signal to the infrared receiver array by using the microlens structure 425. When the patterned infrared signal is projected onto the infrared receiver array, the patterned infrared signal may present a specified pattern on a plane where the display screen is located. For example, the patterned infrared signal may present a circular ring pattern on the plane where the display screen is located, and signal strength of the circular ring pattern successively decreases from an inner ring to an outer ring (or signal strength successively increases). The processor 411 may calculate a central position of a circular ring receiving area based on the receiving information of the infrared signal, and use the central position of the receiving area as the pointing position of the remote control device 200 on the display screen 413.

Figure 5B:
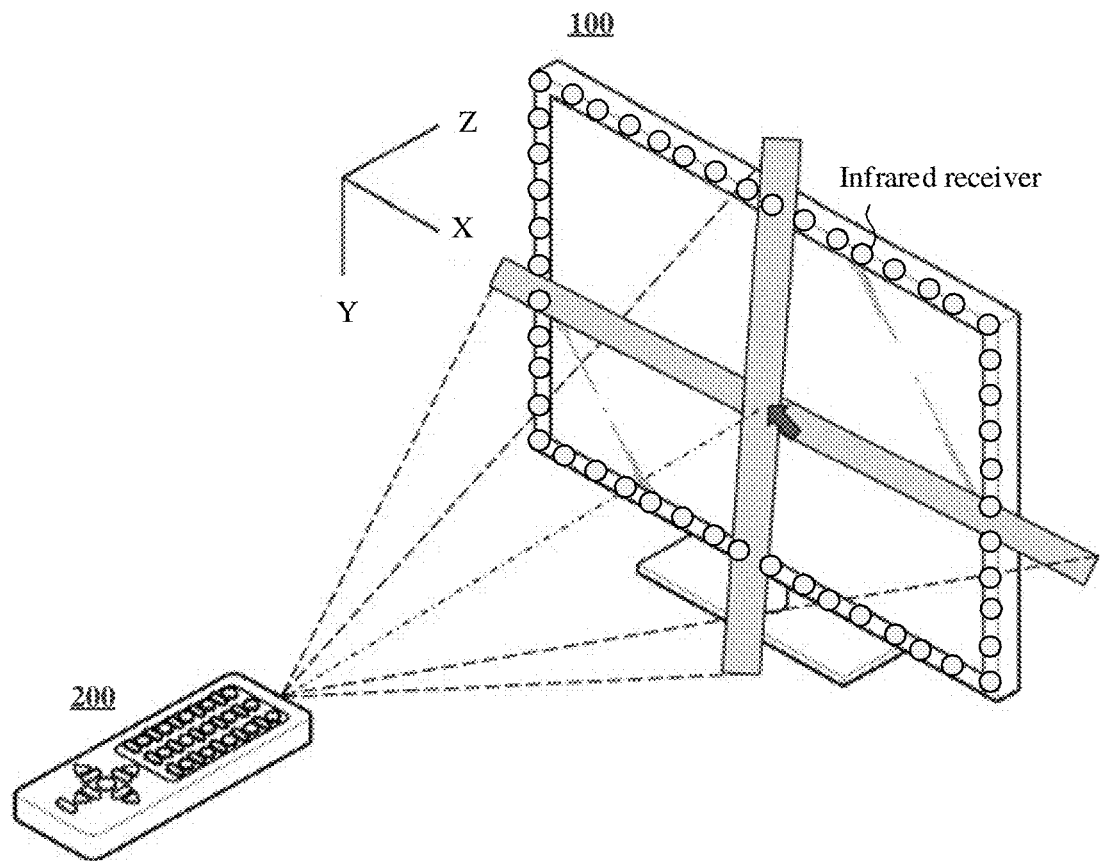
FIG. 5B is a schematic diagram of an application scenario of an infrared receiver frame according to an embodiment of this application.

As shown in FIG. 5B, a plurality of infrared receivers on the display device 100 may be arranged around a display screen to form an infrared receiver frame. The infrared transmitter 422 may send a patterned infrared signal to the infrared receiver frame by using a microlens structure. When the patterned infrared signal is projected onto the display screen 413, the infrared signal may present a specified pattern on a plane where the display screen is located. For example, the patterned infrared signal may present a cross-shaped pattern on the plane where the display screen is located. The processor 411 may calculate a cross intersection point of the cross-shaped pattern based on receiving information of the infrared signal, and use the cross intersection point of the cross-shaped pattern as a pointing position of the remote control device 200 on the display screen 413.

In a possible implementation, when the wireless communication module 414 includes an infrared transmission module, the wireless communication module 414 may modulate an infrared signal with control information and transmit the infrared signal to an infrared receiver array (or an infrared receiver frame) 412 by using a plurality of infrared transmitters 412. The wireless communication module 414 may parse out the control information from the infrared signal received by the infrared receiver array (or the infrared receiver frame) 412, and send the control information to the processor 411. The processor 411 may perform an operation corresponding to the control information.

With reference to infrared signals of different patterns, the following specifically describes how the display device 100 determines the pointing position of the remote control device 200 on the display screen based on a received patterned infrared signal in this embodiment of this application.

In some application scenarios, an infrared receiver array is coupled to the display screen of the display device 100. The infrared transmitter on the remote control device 200 may send a circular infrared signal by using the microlens structure. When receiving the infrared signal by using the infrared receiver array, the display device 100 may calculate a central position of the infrared signal based on a receiving area in which the infrared signal is received, and use the central position of the infrared signal as the pointing position of the remote control device 200 on the display screen of the display device 100. In this way, the remote control device 200 may accurately point to a position in which a user expects to perform an operation on the display screen of the display device 100.

Figure 6:
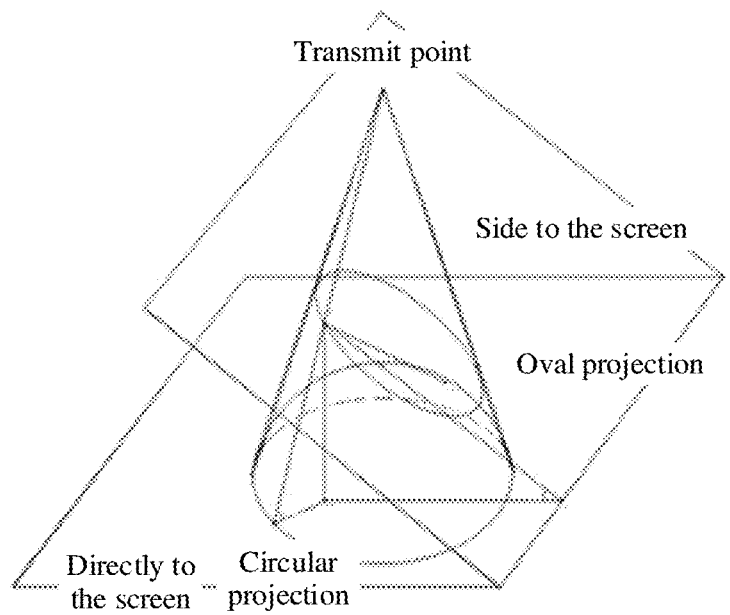
FIG. 6 is a schematic diagram of a projection principle according to an embodiment of this application.

As shown in FIG. 6, when the remote control device 200 is used as a transmit point and transmits a circular infrared signal directly to the display screen of the display device 100, a projection of the infrared signal on the display screen of the display device 100 is a circular projection. When the remote control device 200 is used as a transmit point and transmits a circular infrared signal at a side to the display screen of the display device 100, a projection of the infrared signal on the display screen of the display device 100 is an oval projection.

The display device 100 may determine, by using an infrared receiving array, positions of one or more infrared receivers that detect the infrared signal. Then, the display device 100 may determine a receiving area of the infrared signal based on the positions of the one or more infrared receivers that detect the infrared signal. The display device 100 may calculate a central point of the receiving area based on the receiving area of the infrared signal. Then, the display device 100 may use a central position of the receiving area as a central point of a projection of the infrared signal on the display screen, that is, the pointing position of the remote control device 200 on the display screen.

Figure 7A:
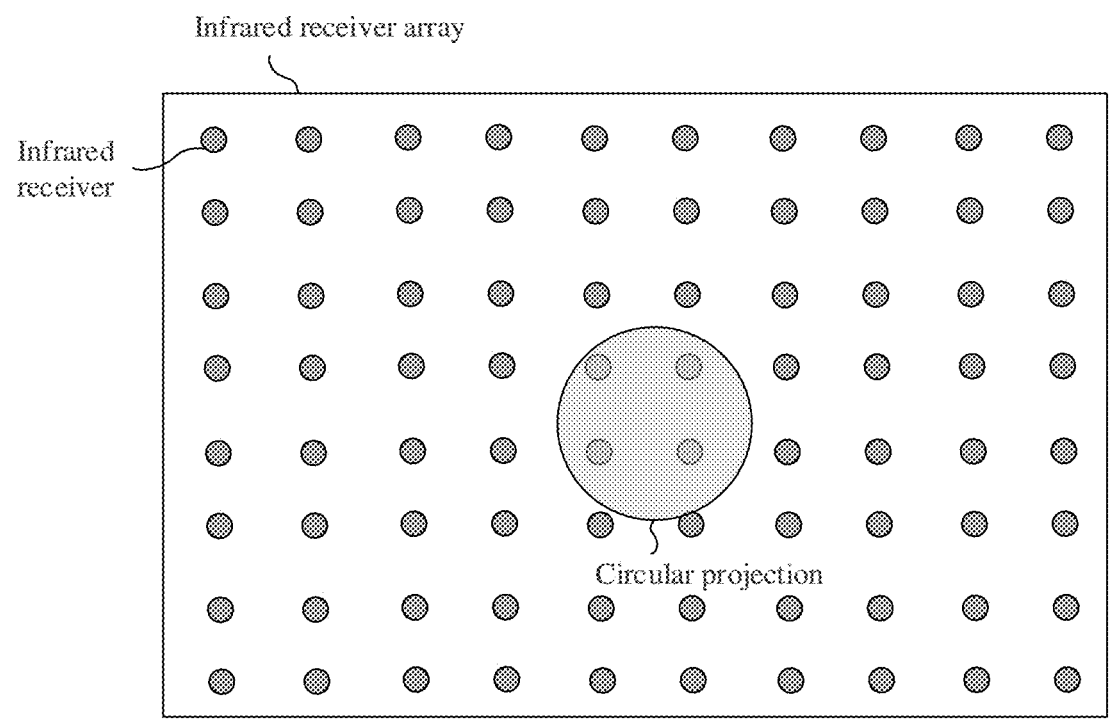
FIG. 7A to FIG. 7C are a group of schematic diagrams of a principle of calculating a pointing position based on a circular projection pattern according to an embodiment of this application.

For example, as shown in FIG. 7A, the display device 100 may receive, by using the infrared receiving array, a circular infrared signal transmitted by the remote control device 200 directly to the display screen. A projection pattern of the infrared signal on the infrared receiver array may be circular. A circular projection of the infrared signal may cover one or more infrared receivers on the infrared receiving array. For example, four infrared receivers on the infrared receiver array detect the infrared signal.

Figure 7B:
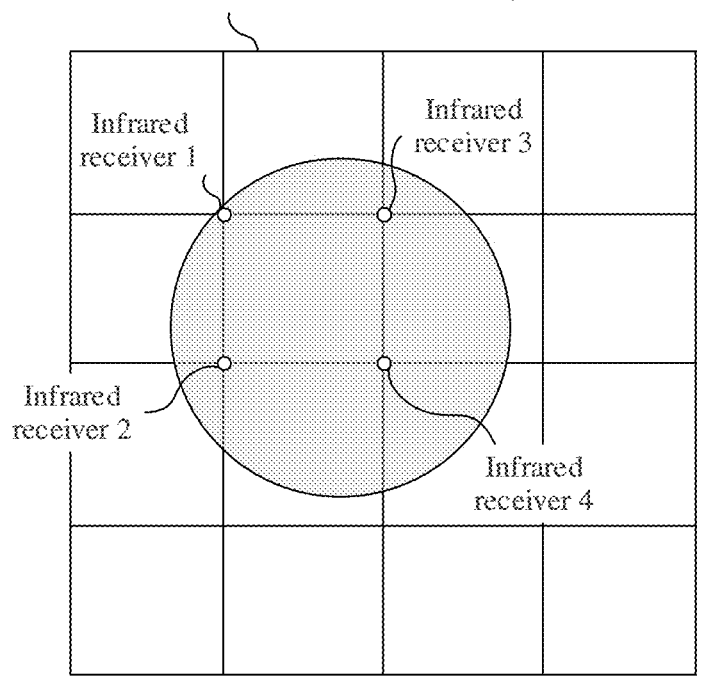

FIG. 7B shows a part of an infrared receiver array. As shown in FIG. 7B, the circular projection of the infrared signal may cover four infrared receivers on the infrared receiving array, such as an infrared receiver 1, an infrared receiver 2, an infrared receiver 3, and an infrared receiver 4.

Figure 7C:
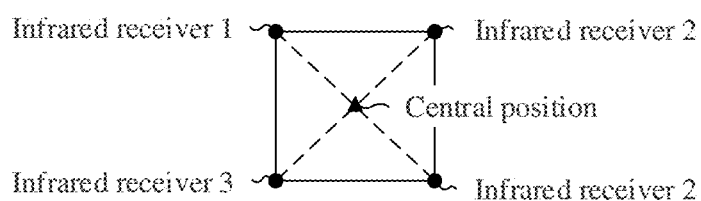

As shown in FIG. 7C, a receiving area (for example, a rectangular area) may be formed at positions of the four infrared receivers: the infrared receiver 1, the infrared receiver 2, the infrared receiver 3, and the infrared receiver 4. The display device 100 may calculate a central position of the receiving area based on the positions of the four receivers, which is used as a central point of a projection of the infrared signal on the display screen, that is, a pointing position of the remote control device 200 on the display screen.

Figure 8A:
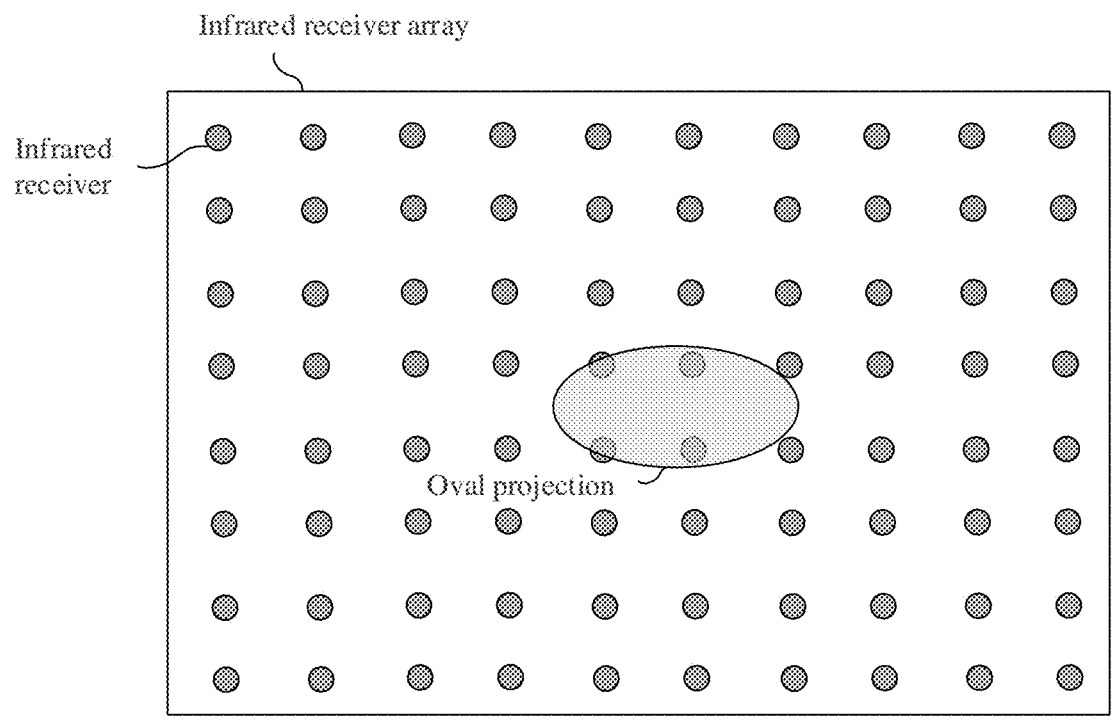
FIG. 8A to FIG. 8C are a group of schematic diagrams of a principle of calculating a pointing position based on an oval projection pattern according to an embodiment of this application.

For another example, as shown in FIG. 8A, the display device 100 may receive, by using the infrared receiving array, an infrared signal transmitted by the remote control device 200 at a side to the display screen. A projection pattern of the infrared signal on the infrared receiver array may be oval. A circular projection of the infrared signal may cover one or more infrared receivers on the infrared receiving array. For example, four infrared receivers detect the infrared signal.

Figure 8B:
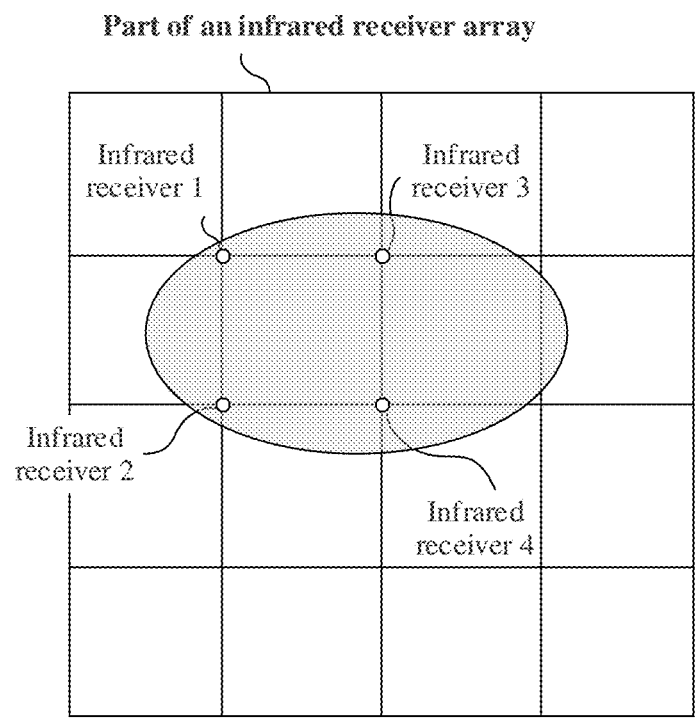

FIG. 8B shows a part of an infrared receiver array. As shown in FIG. 8B, the oval projection of the infrared signal may cover four infrared receivers on the infrared receiving array. For example, four infrared receivers on the infrared receiver array detect the infrared signal.

Figure 8C:
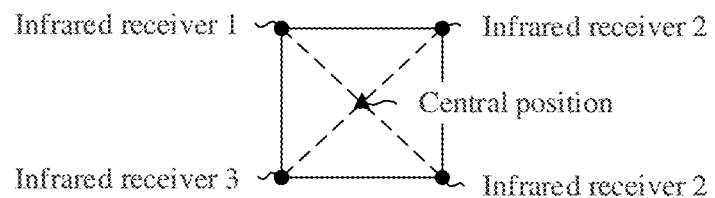

As shown in FIG. 8C, a receiving area (for example, a rectangular area) may be formed at positions of the four infrared receivers: the infrared receiver 1, the infrared receiver 2, the infrared receiver 3, and the infrared receiver 4. The display device 100 may calculate a central position of the receiving area based on the positions of the four receivers, which is used as a central point of an oval projection of the infrared signal on the display screen, that is, a pointing position of the remote control device 200 on the display screen.

In some application scenarios, an infrared receiver array is coupled to the display screen of the display device 100. The remote control device 200 may send a circular ring infrared signal by using an infrared transmitter and a microlens structure. Signal strength of the circular ring infrared signal successively decreases from an inner ring to an outer ring (or signal strength successively increases). When receiving the circular ring infrared signal by using the infrared receiver array, the display device 100 may determine the pointing position of the remote control device 200 on the display screen of the display device 100 based on a receiving area where the circular ring infrared signal is received and signal strength distribution in the receiving area. In this way, the remote control device 200 may accurately point to a position in which a user expects to perform an operation on the display screen of the display device 100.

The display device 100 may determine, by using the infrared receiving array, positions of M receiving points that are in the infrared receiver array and that detect the infrared signal, and signal strength values of the infrared signal received by the M receiving points. Then, the display device 100 may determine the pointing position of the remote control device 200 on the display screen based on the positions of the M receiving points that detect the infrared signal and the signal strength values of the infrared signal received by the M receiving points, where M is a positive integer.

Figure 9A:
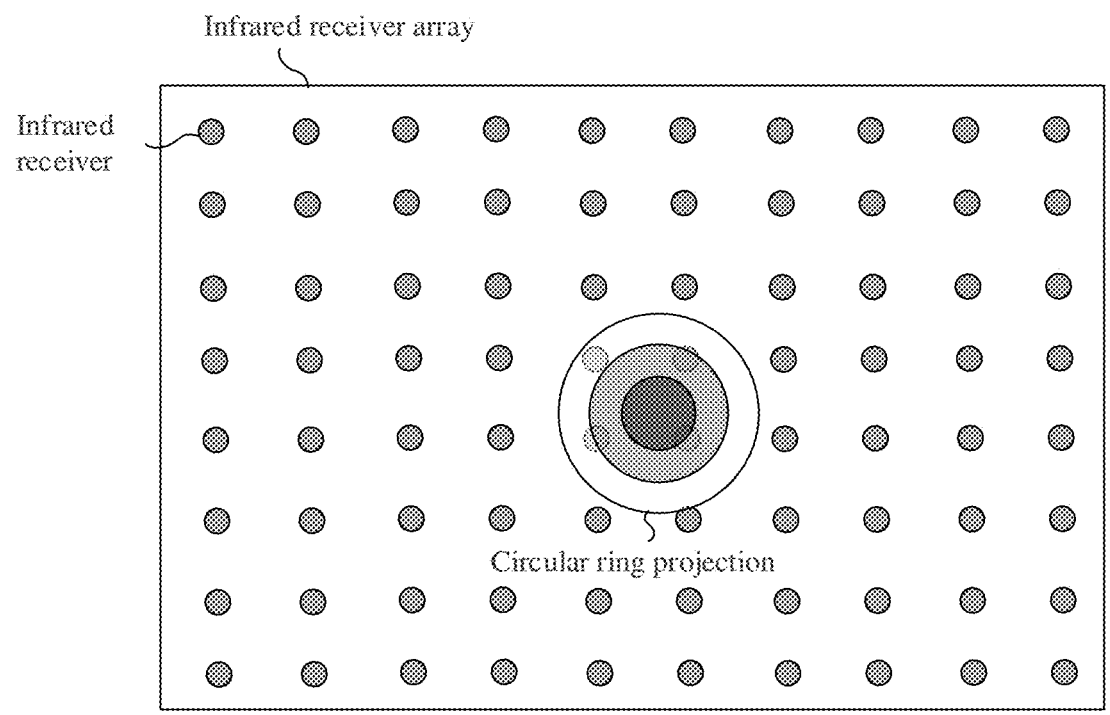
FIG. 9A to FIG. 9C are a group of schematic diagrams of a principle of calculating a pointing position based on a circular ring projection pattern according to an embodiment of this application.

For example, as shown in FIG. 9A, the display device 100 may receive, by using an infrared receiving array, a circular ring infrared signal transmitted by the remote control device 200 directly to the display screen. A projection pattern of the circular ring infrared signal on the infrared receiver array may be a circular ring. A circular projection of the infrared signal may cover M receiving points on the infrared receiving array. For example, four receiving points on the infrared receiver array detect the infrared signal.

Figure 9B:
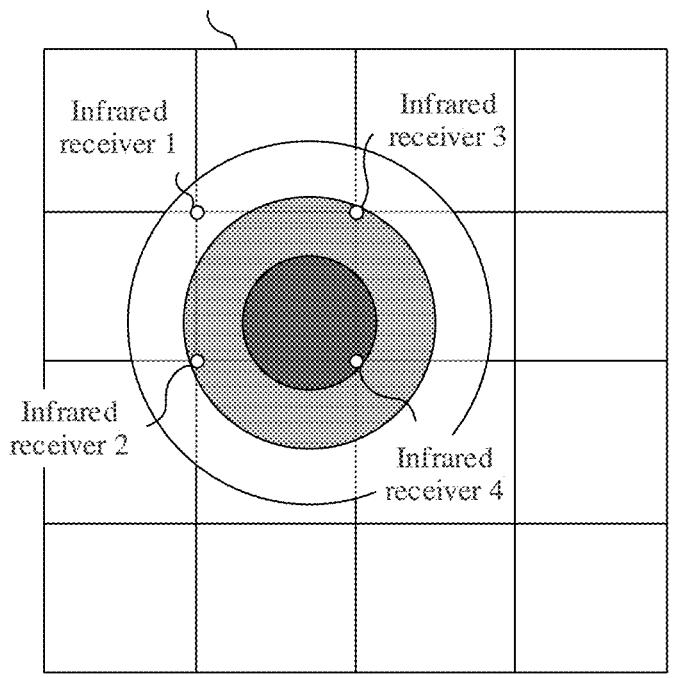

FIG. 9B shows a part of an infrared receiver array. As shown in FIG. 9B, a circular ring projection of the circular ring infrared signal may cover four infrared receivers on the infrared receiving array. The four infrared receivers are receiving points of the circular projection, for example, an infrared receiver 1 (that is, a receiving point 1), an infrared receiver 2 (that is, a receiving point 2), an infrared receiver 3 (that is, a receiving point 3), and an infrared receiver 4 (that is, a receiving point 4). Because energy distribution of each ring of the circular ring infrared signal is different, signal strength of the infrared signal received by the four infrared receivers may be different.

For example, the circular ring projection may have three rings. An inner ring has highest signal strength, a middle ring has medium signal strength, and an outer ring has lowest signal strength. The infrared receiver 1 is located in the outer ring of the circular ring projection, and signal strength of the infrared signal received by the infrared receiver 1 may be −60 dBm. The infrared receiver 2 is located in the middle ring of the circular ring projection, and signal strength of the infrared signal received by the infrared receiver 2 may be −40 dBm. The infrared receiver 3 is located in the middle ring of the circular ring projection, and signal strength of the infrared signal received by the infrared receiver 3 may be −40 dBm. The infrared receiver 4 is located in the inner ring of the circular ring projection, and signal strength of the infrared signal received by the infrared receiver 3 may be −20 dBm.

A correspondence between signal strength and inner and outer radiuses of a circular ring may be shown in the following Table 1:

TABLE 1

| Signal strength | Inner radius of a circular ring | Outer radius of a circular ring |
| --- | --- | --- |
| [−20 dBm, 0 dBm) | 0 | 12 mm |
| [−40 dBm, −20 dBm) | 12 mm | 16 mm |
| (−∞, −40 dBm) | 16 mm | 20 mm |

It may be learned from the foregoing Table 1 that when signal strength of an infrared signal received by the infrared receiver is greater than or equal to −20 dBm, an inner radius of a circular ring corresponding to the infrared receiver is o, and an outer radius is 12 mm. When signal strength of an infrared signal received by the infrared receiver is greater than or equal to −40 dBm and less than −20 dBm, an inner radius of a circular ring corresponding to the infrared receiver is 12 mm, and an outer radius is 16 mm. When signal strength of an infrared signal received by the infrared receiver is less than −40 dBm, an inner radius of a circular ring corresponding to the infrared receiver is 16 mm, and an outer radius is 20 mm. The foregoing example in Table 1 is merely used to describe this application, and shall not constitute a limitation.

The display device 100 may use a position of the infrared receiver that receives a circular ring infrared signal as a center, and use an outer circle radius and an inner circle radius that correspond to signal receiving strength of the infrared signal received by the infrared receiver as a circular ring. When only one infrared receiver receives an infrared signal, the display device 100 may use a position of the only infrared receiver that receives the infrared signal as a pointing position of the remote control device 200 on the display screen. When a plurality of infrared receivers receive the circular ring infrared signal, the display device 100 may determine an overlapping area of a plurality of circular rings based on the circular rings respectively corresponding to the plurality of infrared receivers that receive the circular ring infrared signal. The display device 100 may determine the overlapping area of the plurality of circular rings as a pointing position of the remote control device 200 on the display screen. In a possible implementation, the display device 100 may determine a geometric center point of the overlapping area of the plurality of circular rings as the pointing position of the remote control device 200 on the display screen.

Figure 9C:
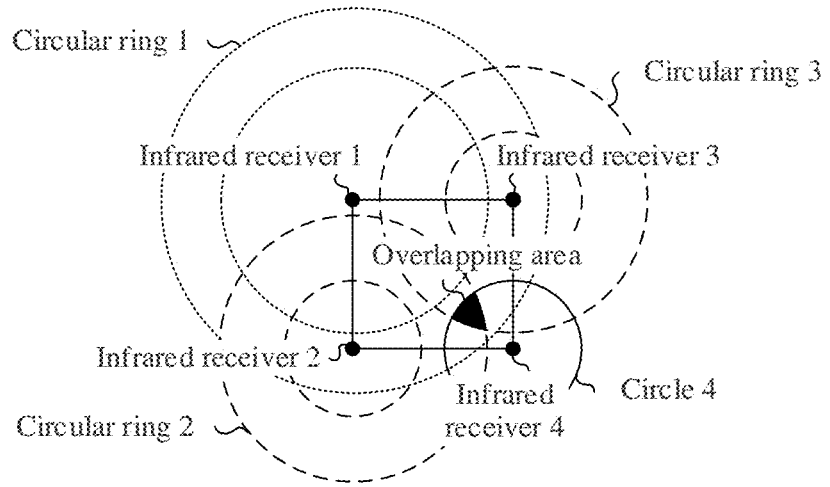

For example, as shown in FIG. 9C, signal strength received by the infrared receiver 1 may be −60 dBm, an outer circle radius of a circular ring 1 corresponding to the infrared receiver 1 may be 20 mm, and an inner circle radius may be 16 mm. Signal strength received by the infrared receiver 2 may be −40 dBm, an outer radius of a circular ring 2 corresponding to the infrared receiver 2 may be 16 mm, and an inner radius may be 12 mm. Signal strength received by the infrared receiver 3 may be −40 dBm, an outer radius of a circular ring 3 corresponding to the infrared receiver 3 may be 16 mm, and an inner radius may be 12 mm. Signal strength received by the infrared receiver 4 may be −20 dBm, an outer radius of a circular ring 4 corresponding to the infrared receiver 4 may be 12 mm, and an inner radius may be 0. When the inner radius of the circular ring 4 is o, the circular ring 4 is circular.

The display device 100 may determine an overlapping area of the circular ring 1, the circular ring 2, the circular ring 3, and the circular ring 4 based on the circular ring 1, the circular ring 2, the circular ring 3, and the circular ring 4. The display device 100 may use the overlapping area as the pointing position of the remote control device 200 on the display screen. In a possible implementation, the display device 100 may use a geometric center position of the overlapping area as the pointing position of the remote control device 200 on the display screen.

In some embodiments, the display device 100 may determine that circular rings corresponding to all infrared receivers that detect a circular ring infrared signal have no overlapping area. The display device 100 may determine type A infrared receivers (such as an infrared receiver 2 and an infrared receiver 4) whose receiving signal strength is greater than first signal strength (such as −30 dBm) from all the infrared receivers (such as an infrared receiver 1, an infrared receiver 2, an infrared receiver 3, an infrared receiver 4, an infrared receiver 5, and an infrared receiver 6) that receive the circular ring infrared signal. The display device 100 may calculate an overlapping area of circular rings corresponding to the type A infrared receivers (such as the infrared receiver 1 and the infrared receiver 2), and use the overlapping area of the circular rings corresponding to the type A infrared receivers as the pointing position of the remote control device 200 on the display screen. In a possible implementation, the display device 100 may use a geometric center position of the overlapping area as the pointing position of the remote control device 200 on the display screen.

Figure 10A:
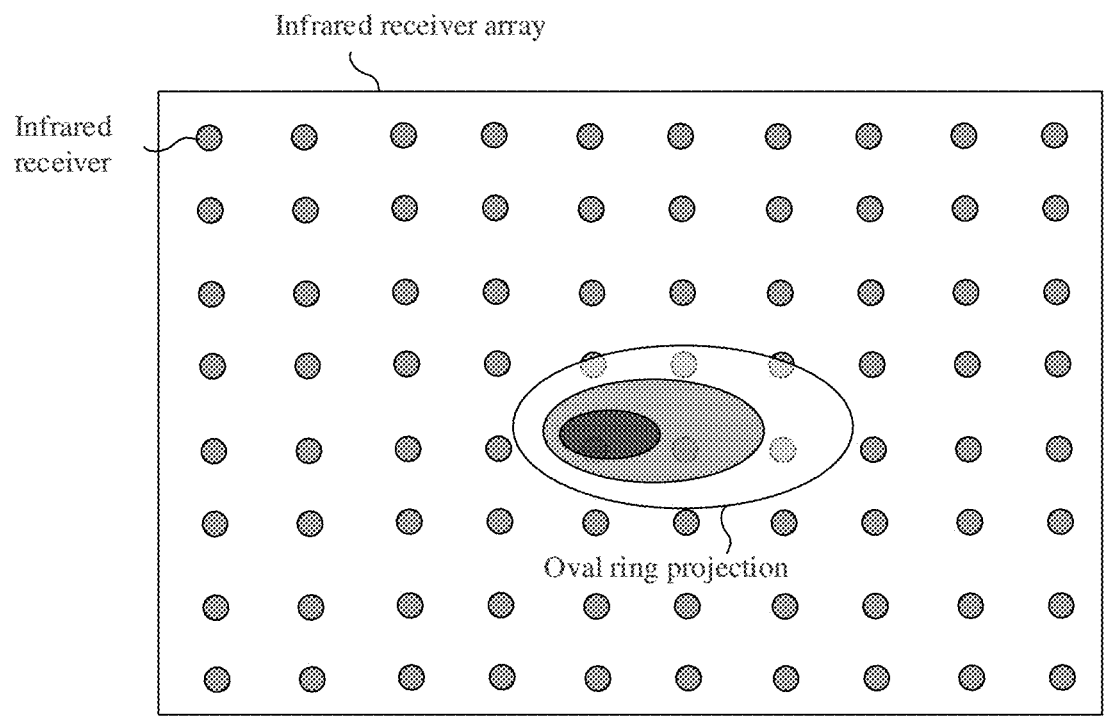
FIG. 10A to FIG. 10D are a group of schematic diagrams of a principle of calculating a pointing position based on an oval ring projection pattern according to an embodiment of this application.

For example, as shown in FIG. 10A, the display device 100 may receive, by using an infrared receiving array, a circular ring infrared signal transmitted by the remote control device 200 at a side to the display screen. A projection pattern of the circular ring infrared signal on the infrared receiver array may be an oval ring. An oval ring projection of the circular ring infrared signal may cover M receiving points on the infrared receiving array. For example, six receiving points on the infrared receiver array detect the infrared signal.

Figure 10B:
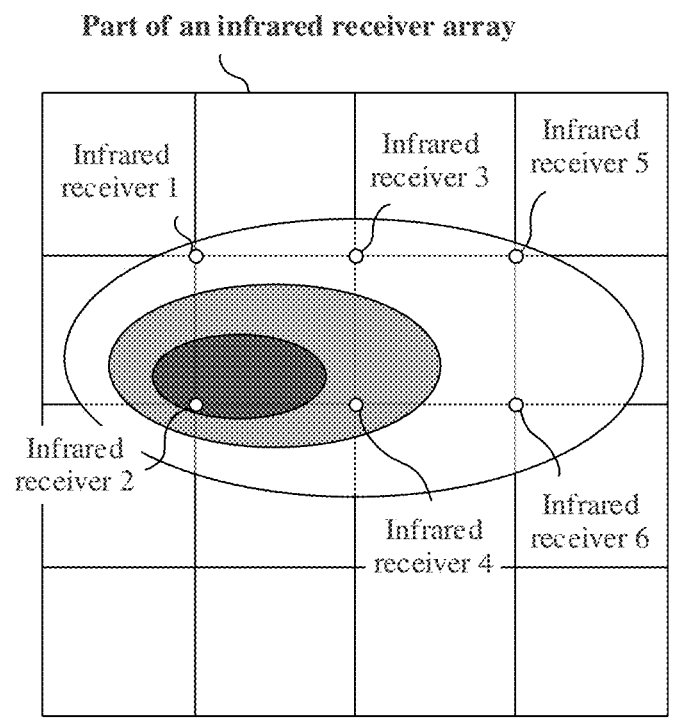
Figure 10C:
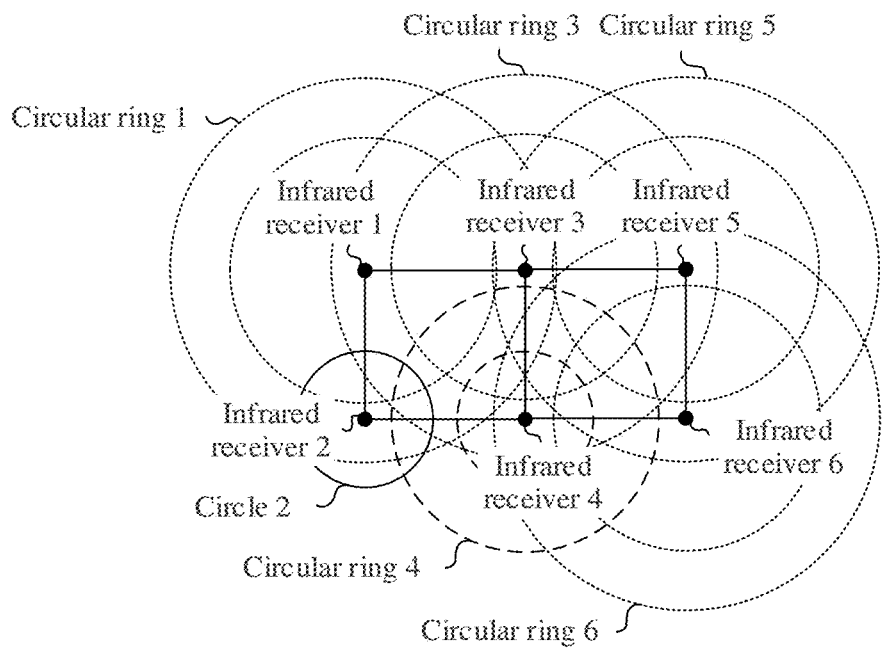

FIG. 10B shows a part of an infrared receiver array. As shown in FIG. 10B, a circular ring projection of the infrared signal may cover six receiving points on the infrared receiving array, such as an infrared receiver 1 (that is, a receiving point 1), an infrared receiver 2 (that is, a receiving point 2), an infrared receiver 3 (that is, a receiving point 3), an infrared receiver 4 (that is, a receiving point 4), an infrared receiver 5 (that is, a receiving point 5), and an infrared receiver 6 (that is, a receiving point 6). Because energy distribution of each ring of the circular ring infrared signal is different, signal strength of the infrared signal received by the four infrared receivers may be different.

For example, the oval ring projection may have three rings. An inner ring has highest signal strength, a middle ring has medium signal strength, and an outer ring has lowest signal strength. The infrared receiver 1, the infrared receiver 3, the infrared receiver 5, and the infrared receiver 6 are located in the outer ring of the circular ring projection. Signal strength of the infrared signal received by the infrared receiver 1 may be −60 dBm, signal strength of the infrared signal received by the infrared receiver 3 may be −62 dBm, signal strength of the infrared signal received by the infrared receiver 5 may be −64 dBm, and signal strength received by the infrared receiver 6 may be −65 dBm. The infrared receiver 4 is located in the middle ring of the circular ring projection, and signal strength received by the infrared receiver 4 may be −40 dBm. The infrared receiver 2 is located in the inner ring of the circular ring projection, and signal strength received by the infrared receiver 2 may be −20 dBm. With reference to the foregoing Table 1, an outer radius of each of the ring 1, the ring 3, the ring 5, and the ring 6 may be 20 mm, and an inner radius may be 16 mm. An outer radius of the ring 4 may be 16 mm, and an inner radius may be 12 mm. An outer radius of the ring 2 may be 12 mm, and an inner radius may be 0. When the inner radius of the ring 2 is o, the ring 2 is circular.

As shown in FIG. loC, the display device 100 may determine that circular rings (such as a circular ring 1, a circular ring 2, a circular ring 3, a circular ring 4, a circular ring 5, and a circular ring 6) corresponding to all infrared receivers (such as an infrared receiver 1, an infrared receiver 2, an infrared receiver 3, an infrared receiver 4, an infrared receiver 5, and an infrared receiver 6) that detect a circular ring infrared signal have no overlapping area.

Figure 10D:
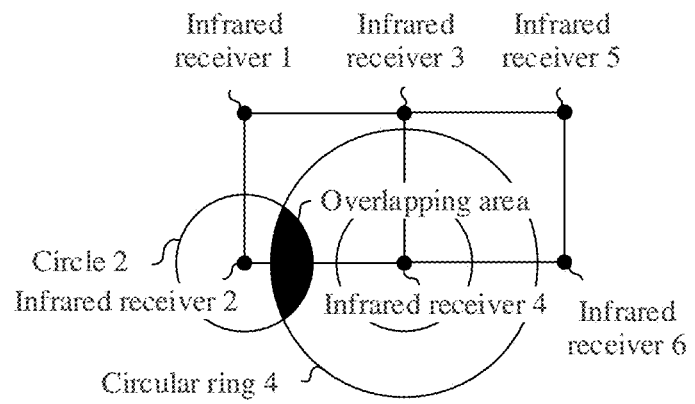

As shown in FIG. 10D, the display device 100 may determine type A receiving points (such as an infrared receiver 2 and an infrared receiver 4) whose receiving signal strength is greater than first signal strength (such as −30 dBm) from all receiving points (such as an infrared receiver 1, the infrared receiver 2, an infrared receiver 3, the infrared receiver 4, an infrared receiver 5, and an infrared receiver 6) that receive a circular ring infrared signal. The display device 100 may calculate an overlapping area of circular rings corresponding to the type A receiving points (such as the infrared receiver 2 and the infrared receiver 4), and use the overlapping area of the circular rings corresponding to the type A receiving points as the pointing position of the remote control device 200 on the display screen. In a possible implementation, the display device 100 may use a geometric center position of the overlapping area as the pointing position of the remote control device 200 on the display screen.

In some application scenarios, a plurality of infrared receivers on the display device 100 may be arranged on a frame around the display screen. The remote control device 200 may send an infrared signal of a cross-shaped pattern by using an infrared transmitter and a microlens structure. When receiving the cross-shaped infrared signal by using an infrared receiver frame, the display device 100 may determine an intersection point of the cross-shaped pattern, and use the intersection point as a pointing position of the remote control device 200 on the display screen of the display device 100. In this way, an infrared signal transmitted by the remote control device 200 may not pass through the display screen, so that signal strength of the infrared signal received by the display device boo is higher, which can accurately point to a position in which a user expects to perform an operation on the display screen of the display device 100.

Figure 11A:
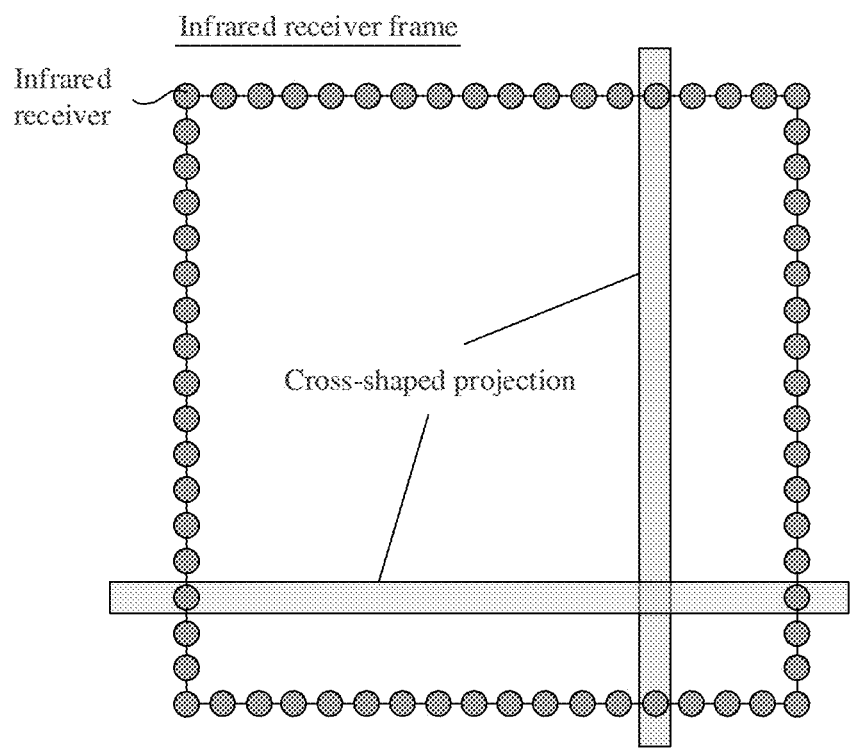
FIG. 11A and FIG. 11B are a group of schematic diagrams of a principle of calculating a pointing position based on a cross-shaped projection pattern according to an embodiment of this application.

For example, as shown in FIG. 11A, the display device 100 may receive, by using the infrared receiving frame around the display screen, a cross-shaped infrared signal transmitted by the remote control device 200. A projection of the cross-shaped infrared signal on the infrared receiver array may be a cross. A cross-shaped projection of the infrared signal may cover four receiving points on the infrared receiving frame.

Figure 11B:
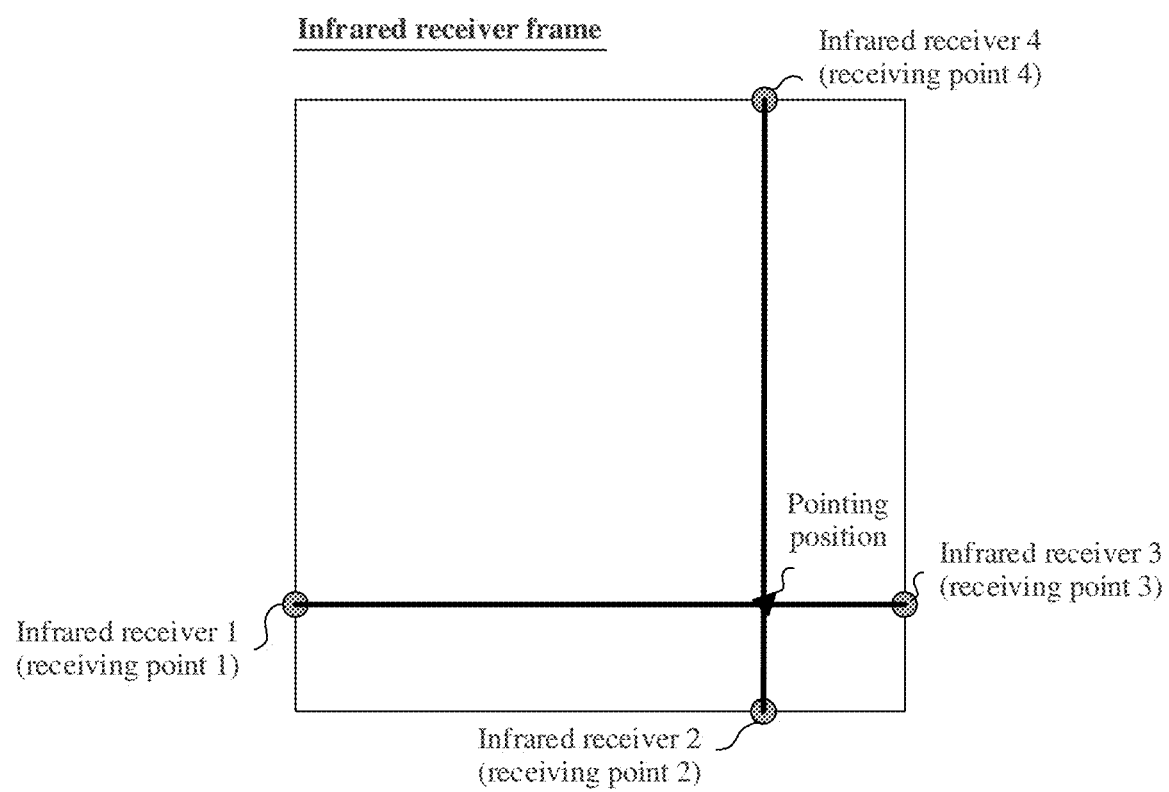

As shown in FIG. 11B, four infrared receivers that are not adjacent to each other on the infrared receiving frame receive the infrared signal, such as an infrared receiver 1, an infrared receiver 2, an infrared receiver 3, and an infrared receiver 4. The display device 100 may respectively use positions of the four infrared receivers that are not adjacent to each other as four receiving points of the infrared signal. The display device 100 may connect the four receiving points in pairs (for example, a receiving point 1 is connected to a receiving point 3, and a receiving point 2 is connected to a receiving point 4), determine an intersection point of connection lines located in an infrared receiver frame, and use the intersection point of connection lines as a pointing position of the remote control device 200 on the display screen of the display device 100.

Figure 12A:
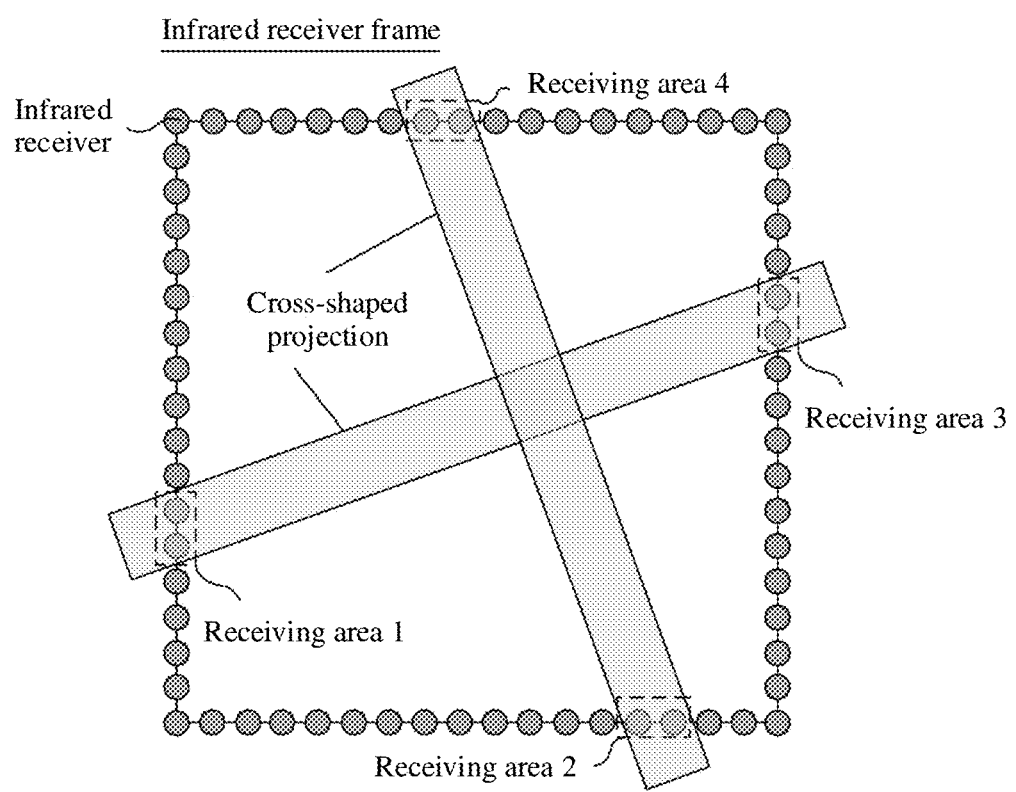
FIG. 12A and FIG. 12B are another group of schematic diagrams of a principle of calculating a pointing position based on a cross-shaped projection pattern according to an embodiment of this application.

In some embodiments, as shown in FIG. 12A, the display device 100 may receive, by using an infrared receiving frame around the display screen, a cross-shaped infrared signal transmitted by the remote control device 200. Four receiving areas (for example, a receiving area 1, a receiving area 2, a receiving area 3, and a receiving area 4) that are not adjacent to each other on the infrared receiving frame receive the infrared signal. Each receiving area includes one or more infrared receivers that receive the infrared signal.

Figure 12B:
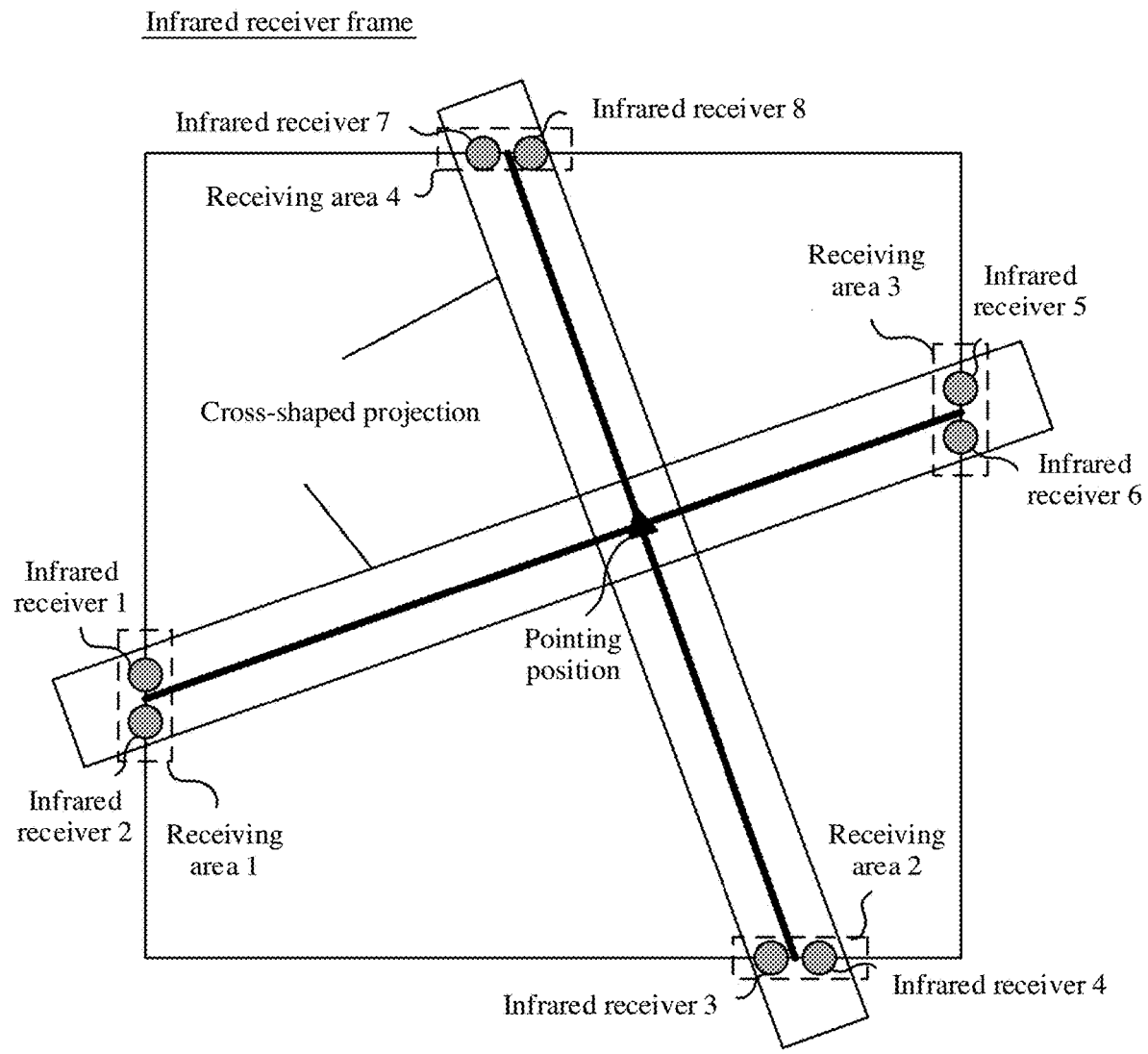

As shown in FIG. 12B, four receiving areas that are not adjacent to each other on the infrared receiving frame receive the infrared signal, for example, a receiving area 1, a receiving area 2, a receiving area 3, and a receiving area 4. The receiving area 1 includes an infrared receiver 1 and an infrared receiver 2, the receiving area 2 includes an infrared receiver 3 and an infrared receiver 4, the receiving area 3 includes an infrared receiver 5 and an infrared receiver 6, and the receiving area 4 includes an infrared receiver 7 and an infrared receiver 8. The display device 100 may use a central point of each receiving area as a receiving point, and the four receiving points may be connected in pairs to determine an intersection point of connection lines located in an infrared receiver frame. The display device 100 may use the intersection point of connection lines inside the infrared receiver frame as a pointing position of the remote control device 200 on the display screen of the display device 100.

The following describes a pointing remote control method according to an embodiment of this application.

Figure 13:
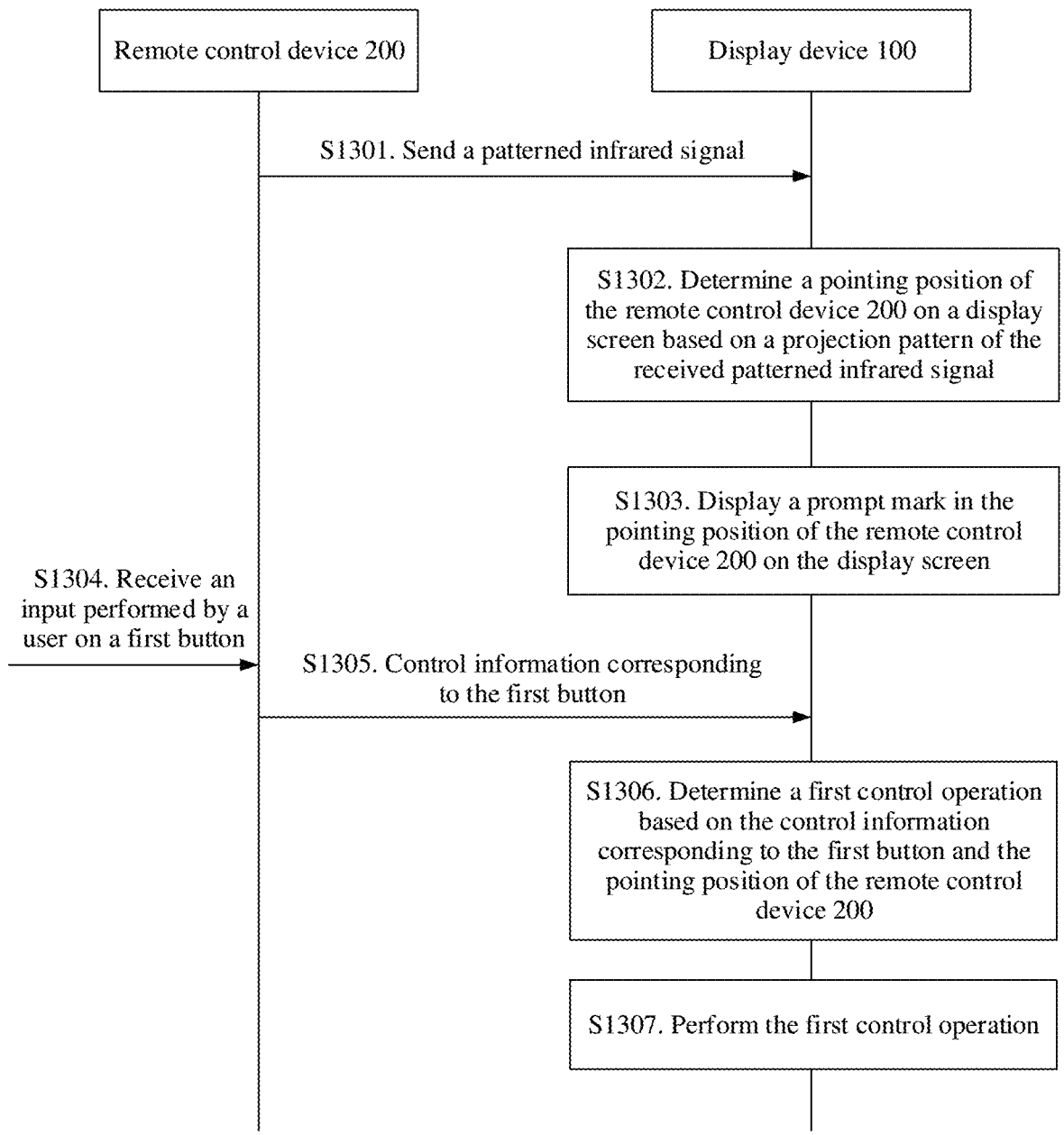
FIG. 13 is a schematic flowchart of a pointing remote control method according to an embodiment of this application.

FIG. 13 is a schematic flowchart of a pointing remote control method according to an embodiment of this application. The pointing remote control method may be applied to a remote control system. The remote control system may include a display device 100 and a remote control device 200. The display device 100 may include an infrared receiver array coupled to a display screen or an infrared receiving frame disposed around a display screen. As shown in FIG. 13, the method may include the following steps.

S1301. The remote control device 200 sends a patterned infrared signal.

For example, the patterned infrared signal may be an infrared signal of a circular pattern, an infrared signal of a circular ring pattern, or an infrared signal of a cross-shaped pattern. For details, refer to the foregoing embodiments shown in FIG. 3A to FIG. 3D. Details are not described herein again. In this embodiment of this application, the patterned infrared signal may alternatively be an infrared signal of another pattern, for example, a square ring pattern, an H-shaped pattern, or an X-shaped pattern (not 90° intersection). In some embodiments, energy distribution in each ring may be different in an infrared signal of a circular ring or a square ring, for example, infrared signal energy of the circular ring or the square ring decreases progressively from inside to outside, or infrared signal energy of a circular ring or a square ring increases progressively from inside to outside.

S1302. The display device 100 determines a pointing position of the remote control device 200 on the display screen based on a projection pattern of the received patterned infrared signal on the display screen.

Specifically, the display device 100 may determine the pointing position of the remote control device 200 on the display screen based on position information of one or more infrared receivers that detect the projection pattern. For specific content, references may be made to the foregoing embodiments shown in FIG. 7A to FIG. 7C, or the embodiments shown in FIG. 8A to FIG. 8C, or the embodiments shown in FIG. 9A to FIG. 9C, or the embodiments shown in FIG. 10A to FIG. 10D, or the embodiments shown in FIG. 11A and FIG. 11B, or the embodiments shown in FIG. 12A and FIG. 12B. Details are not described herein again.

S1303. The display device 100 displays a prompt mark in the pointing position of the remote control device 200 on the display screen.

The prompt mark may be used to prompt a user with the pointing position of the remote control device 200 on the display screen of the display device 100. The prompt mark may be a mark such as types of an arrow or a halo.

Figures 1, 14A:
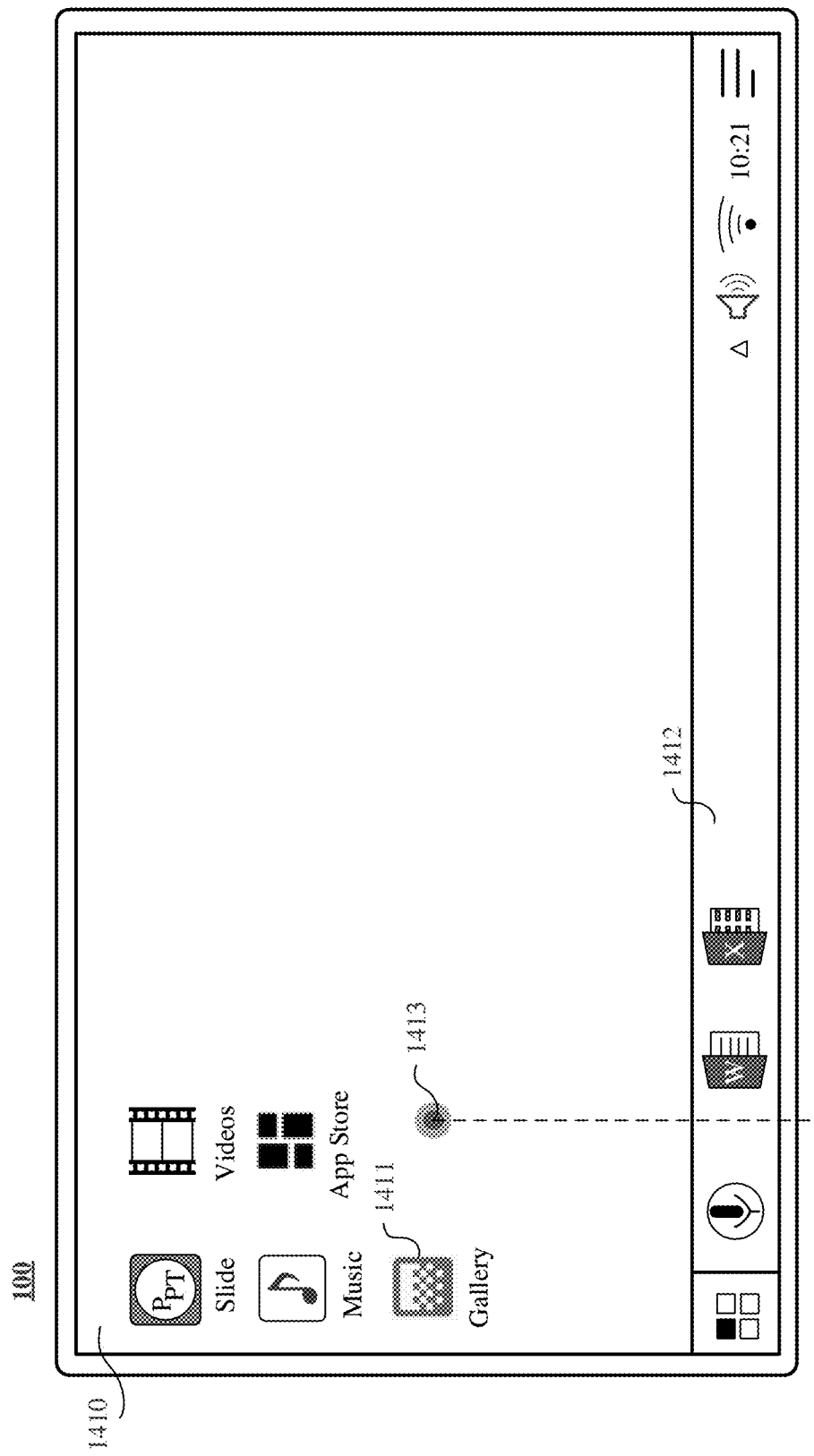
Figures 2, 14A:
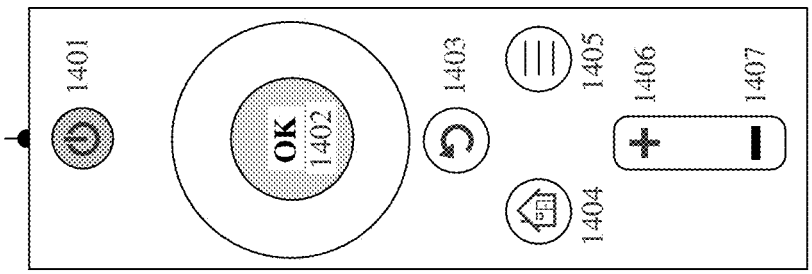

For example, as shown in FIG. 14A-1, the display device 100 may display a main interface 1410. The main interface 1410 includes a plurality of application icons (for example, a slide application icon, a video application icon, a music application icon, an App Store application icon, and a gallery application icon 1411). The main interface 1410 may further include a taskbar 1412. The taskbar 1412 may include shortcuts of one or more applications (for example, a shortcut of a voice assistant application, a shortcut of a document application, and a shortcut of a table application), a status bar (including a volume adjustment icon, a Wi-Fi signal icon, and time), and the like. After the display device 100 determines the pointing position of the remote control device 200 on the display screen, the display device 100 may display an indication mark 1413 on the display screen. The indication mark 1413 is used to indicate the pointing position of the remote control device 200 on the display screen.

In this embodiment of this application, step S1301 to step S1303 may be periodically performed. For example, performing periods of step S1301 to step S1303 may be 10 ms. In a possible implementation, performing periods of steps S1301, S1302, and S1303 may be different. For example, the performing period of step S1301 may be 26.3 µs, and the performing periods of step S1302 and step S1303 may be 10 ms.

S1304. The remote control device 200 receives an input performed by a user on a first button.

S1305. The remote control device 200 sends control information corresponding to the first button to the display device.

The remote control device 200 may include one or more buttons, and the one or more buttons may be physical buttons.

As shown in FIG. 14A-2, the remote control device 200 may include a power button 1401, an OK button 1402, a back button 1403, a home button 1404, a menu button 1405, a volume up button 1406, and a volume down button 1407. The foregoing buttons are physical buttons.

In a possible implementation, the one or more buttons may alternatively be virtual buttons. For example, the remote control device 200 may be an intelligent terminal with a touchscreen, such as a mobile phone. The remote control device 200 may display one or more virtual buttons by using the touchscreen.

The first button may be any one of the foregoing one or more buttons. After receiving the input (for example, clicking) from the user on the first button, the remote control device 200 may match the control information corresponding to the first button. The remote control device 200 may send the control information corresponding to the first button to the display device 100 by using a wireless communication technology such as a patterned infrared signal, Bluetooth, and WLAN Direct.

When the remote control device 200 sends the control information corresponding to the first button to the display device 100 by using a patterned infrared signal, the control information corresponding to the first button may be an infrared remote control code. The remote control device 200 may first determine an infrared remote control code corresponding to the first button from an infrared remote control code library. Then, the remote control device 200 may modulate an infrared signal based on the infrared remote control code corresponding to the first button, and transmit the patterned infrared signal to the display device 100 by using an infrared transmitter combined with a microlens structure.

For example, the infrared remote control code library may be shown in the following Table 2:

TABLE 2

| Button | Infrared remote control code |
|---|---|
| Power button | 0x01 |
| OK button | 0x02 |
| Back button | 0x03 |
| Home button | 0x04 |
| Menu button | 0x05 |
| Volume up button | 0x06 |
| Volume down button | 0x07 |
| . . . | . . . |

It may be learned from the foregoing Table 2 that an infrared remote control code corresponding to the power button is "0x01". An infrared remote control code corresponding to the OK button is "0x02". An infrared remote control code corresponding to the back button is "0x03". An infrared remote control code corresponding to the home button is "0x04". An infrared remote control code corresponding to the menu button is "0x05". An infrared remote control code corresponding to the volume up button is "0x06". An infrared remote control code corresponding to the volume down button is "0x07". The foregoing example shown in Table 2 is merely used to describe this application, and shall not constitute a limitation.

S1306. The display device 100 determines a first control operation based on the control information corresponding to the first button and the pointing position of the remote control device 200.

S1307. The display device 100 performs the first control operation.

Figures 1, 14B:
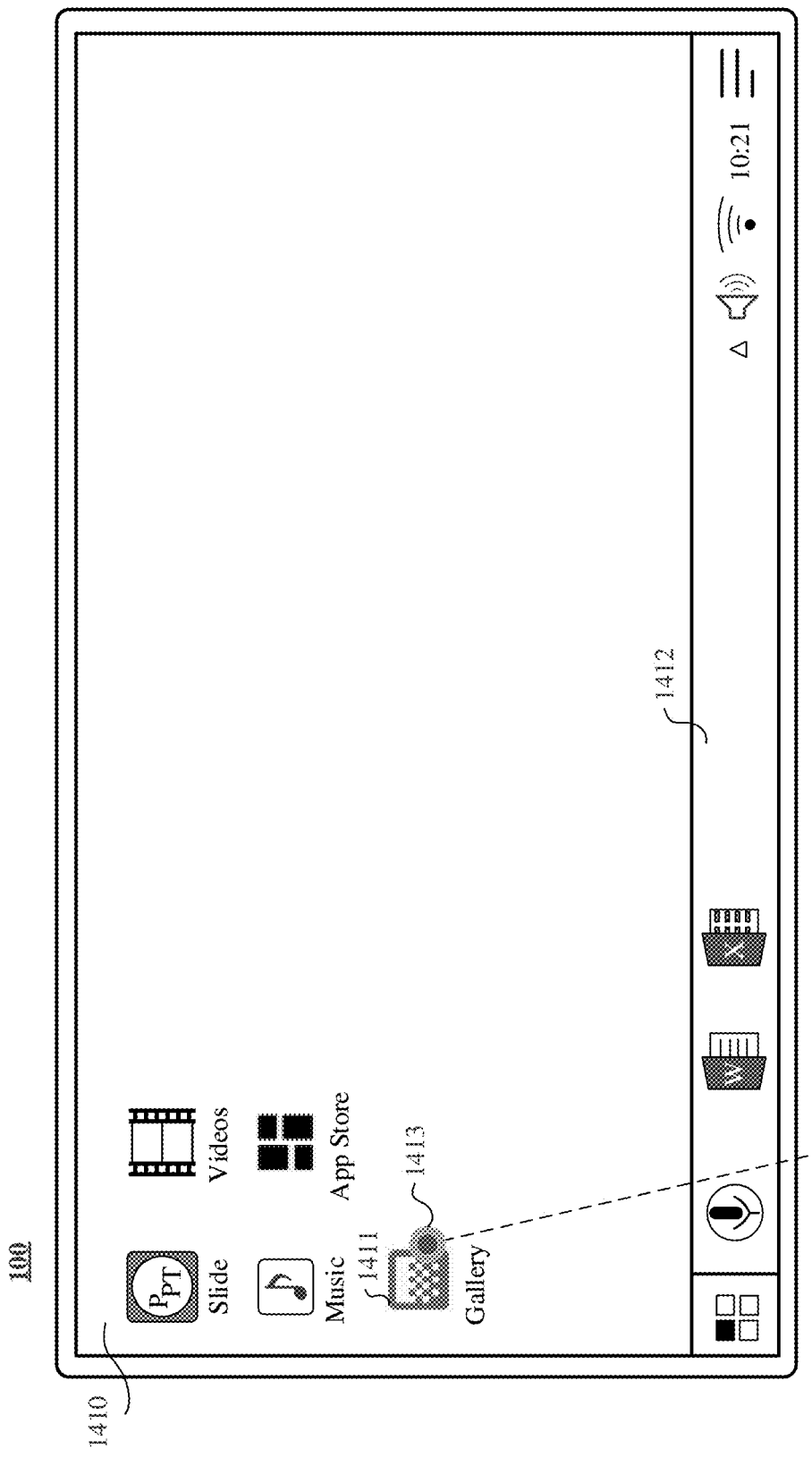
Figures 2, 14B:
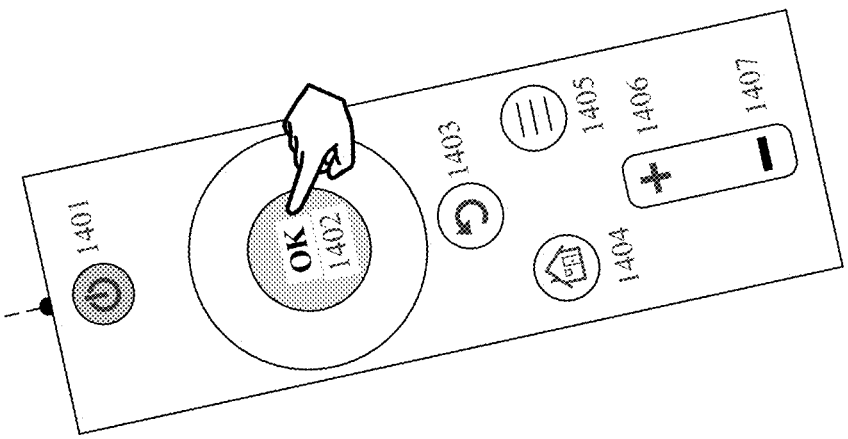

For example, the first control operation may be a click to select operation. As shown in FIG. 14B-1 and FIG. 14B-2, when the display device 100 determines that the remote control device 200 points to the gallery application icon 1411, the display device 100 may display the indication mark 1413 at a position of the gallery application icon 1411. Then, after the display device 100 receives control information corresponding to the OK button 1402 that is sent by the remote control device 200, the display device 100 may determine that the first control operation is a click to select operation for the gallery application icon 1411.

Figures 1, 14C:
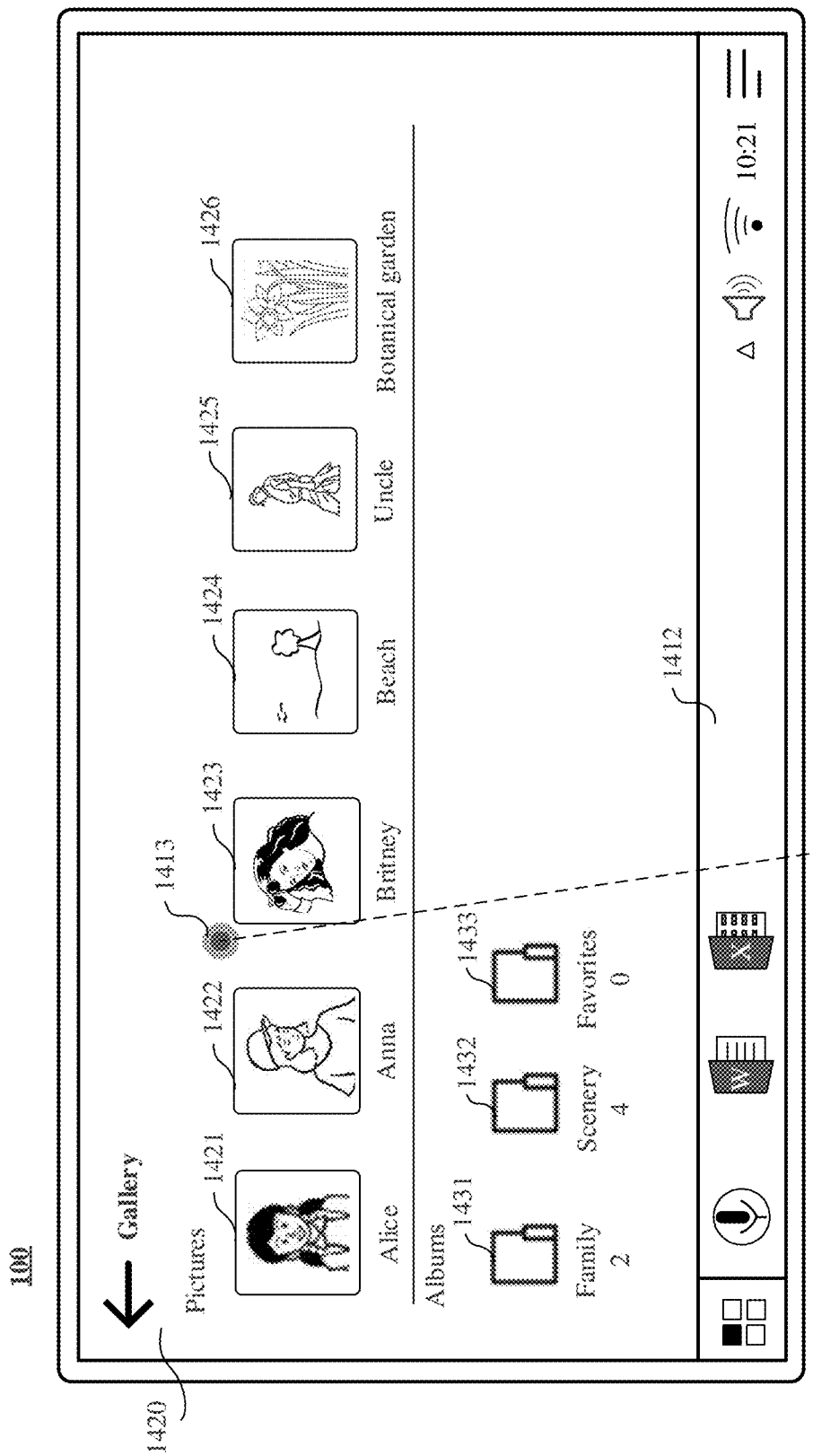

As shown in FIG. 14C-1 and FIG. 14C-2, in response to the click to select operation for the gallery application icon 1411, the display device 100 may display a gallery application interface 1420. The gallery application interface 1420 may include thumbnails of one or more pictures (for example, a thumbnail 1421, a thumbnail 1422, a thumbnail 1423, a thumbnail 1424, a thumbnail 1425, and a thumbnail 1426), and one or more albums (for example, a family album 1431, a scenery album 1432, and a favorites album 1433). A quantity of pictures included in each album is displayed below the album. For example, the family album 1431 includes two pictures, the scenery album 1432 includes four pictures, and the favorites album includes o pictures.

Figures 1, 14D:
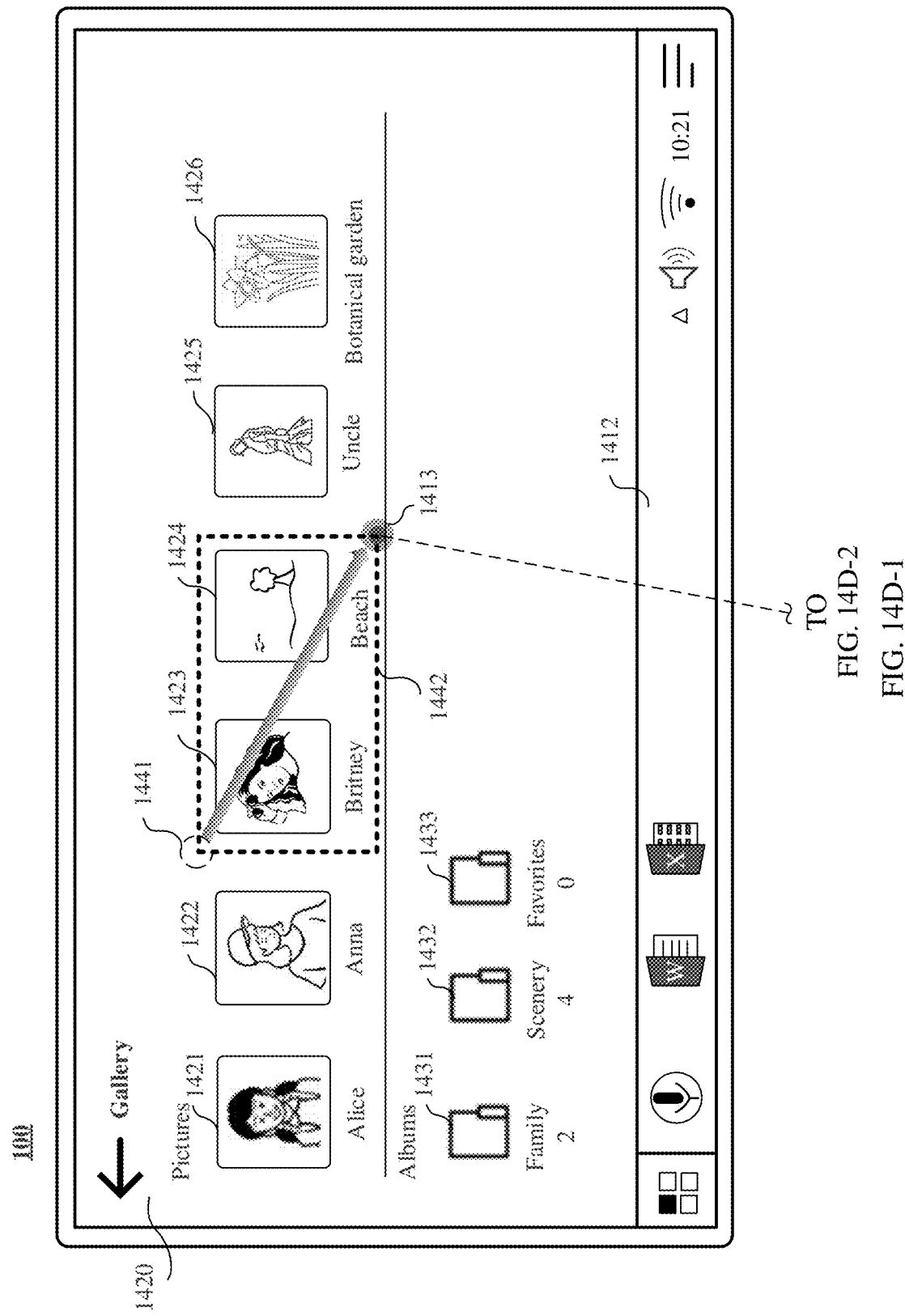
Figures 2, 14D:
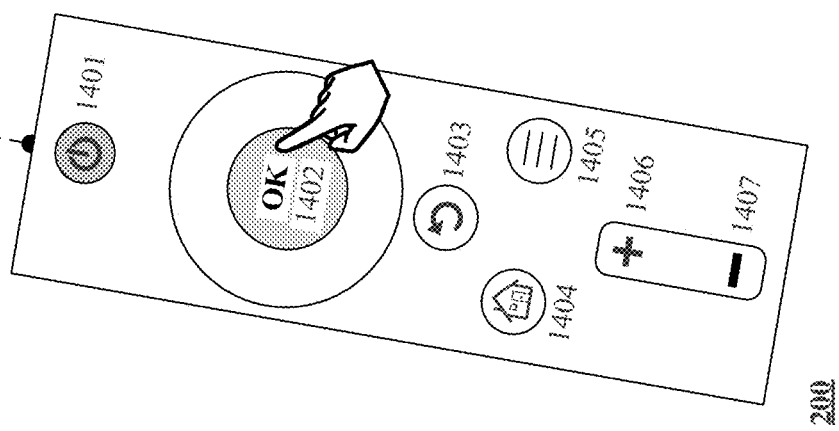

For another example, the first control operation may be a box select operation. As shown in FIG. 14D-1 and FIG. 14D-2, a user may touch and hold the OK button 1402 to adjust the pointing position of the remote control device 200 on the display device 100 from an initial position 1441 to a lower right corner of the thumbnail 1424. When the display device 100 receives, for a long time (for example, greater than is), the control information corresponding to the OK button 1402 that is sent by the remote control device 200 and a position of the indication mark 1413 (for example, the position 1441) has no selection object, the display device 100 may determine that the first control operation is a box select operation. The display device 100 may use the position 1411 as an initial position, use a position of the indication mark 1413 at the time of detecting that the user releases the OK button 1402 as a final position, and use the initial position and the final position as diagonal fixed points of a rectangle, to determine a rectangular frame 1442. The display device 100 may combine one or more selection objects (such as a picture thumbnail 1423 and a picture thumbnail 1424) included in the rectangular frame 1442 into one combined object.

Figures 1, 14E:
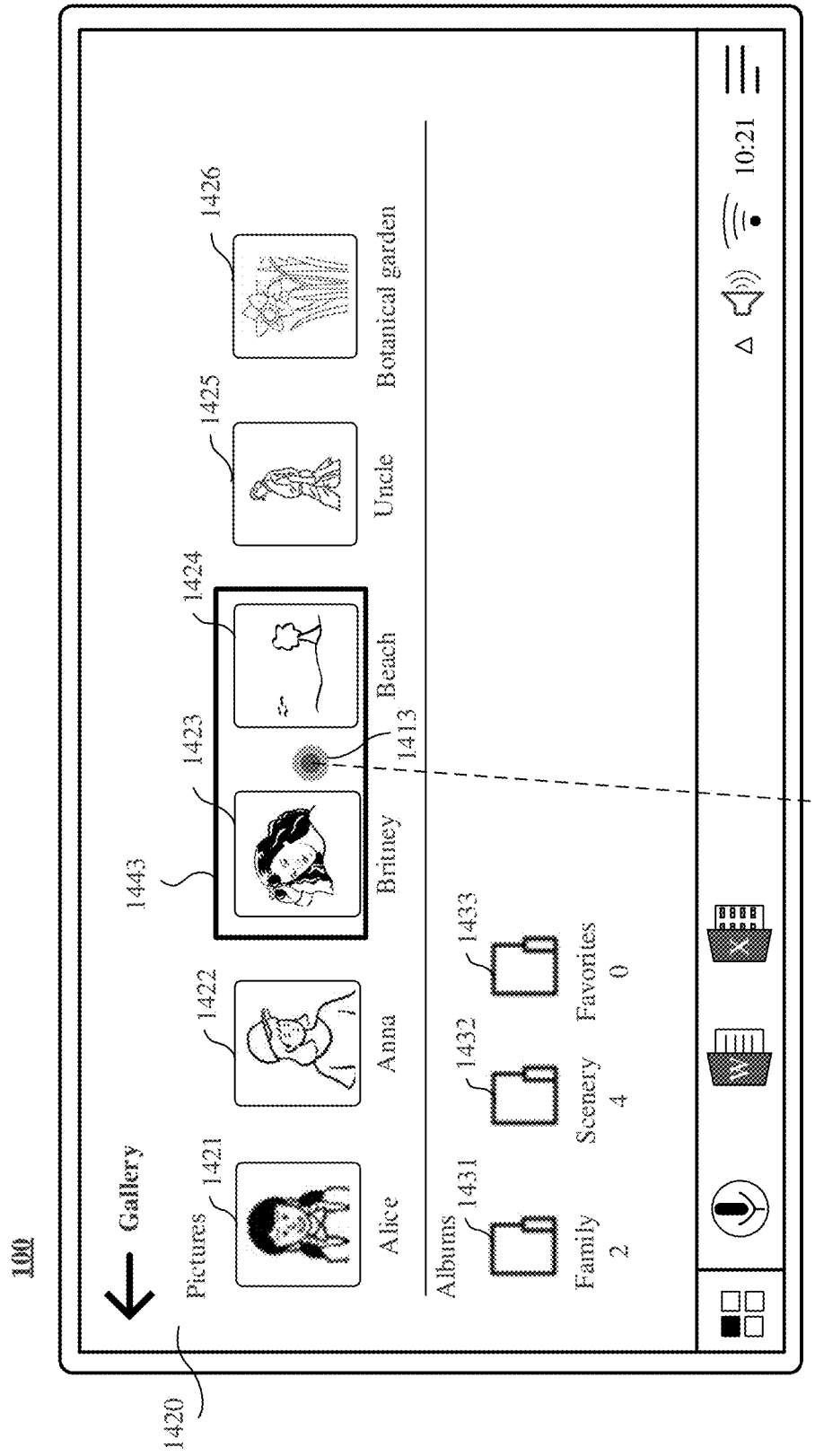
Figures 2, 14E:
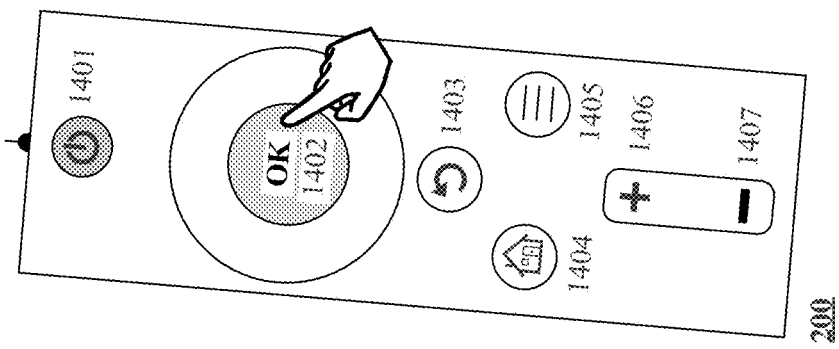

For another example, the first control operation may be a drag operation. As shown in FIG. 14E-1 and FIG. 14E-2, when the display device 100 receives, for a long time (for example, greater than is), the control information corresponding to the OK button 1402 that is sent by the remote control device 200 and a position of the indication mark 1413 (for example, the position 1441) has a combined object frame 1443, the display device 100 may determine that the first control operation is a drag operation. When the user controls, by using the remote control device 200, the indication mark 1413 to move on the display screen of the display device 100, the display device 100 may control one or more selection objects (for example, a thumbnail 1423 and a thumbnail 1424) included in the combined object frame 1433 to move on the display screen along with the indication mark 1413.

Figures 1, 14F:
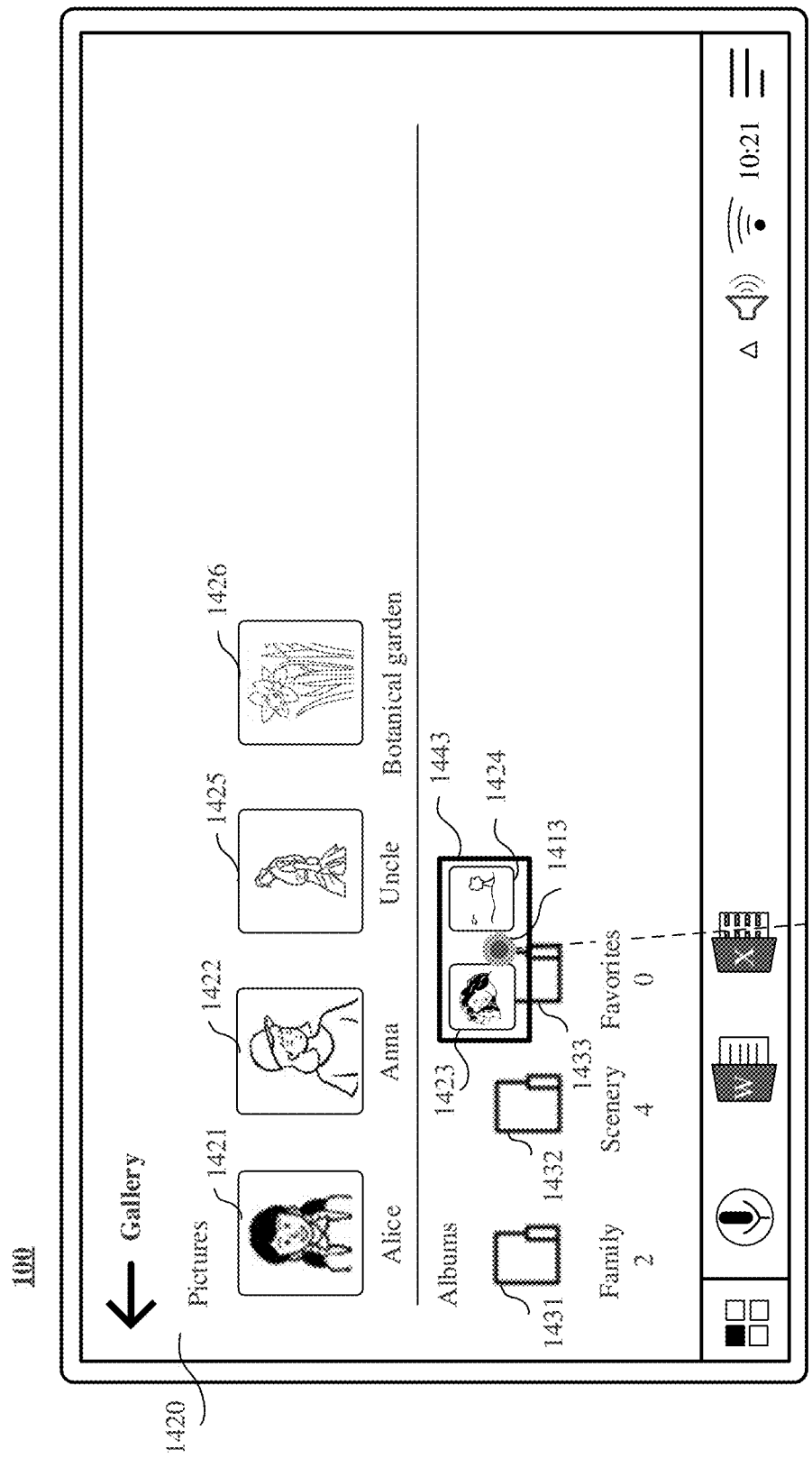
Figures 2, 14F:
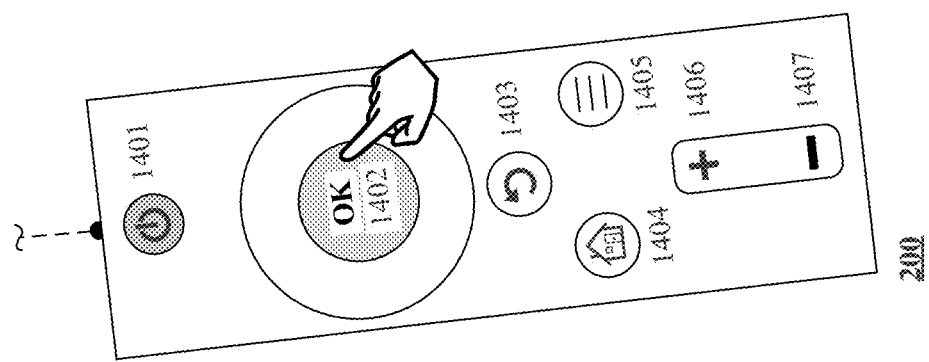

As shown in FIG. 14F-1 and FIG. 14F-2, when the display device 100 detects that a drag operation ends, and a position of the indication mark 1413 is on the favorites album 1433, the display device 100 may store a picture corresponding to the thumbnail 1423 and a picture corresponding to the thumbnail 1424 in the combined object frame 1443 into a storage path corresponding to the favorites album 1433. When the user operates the remote control device 200 and clicks to select the favorites album 1433, the display device 100 may display the picture 1423 and the picture 1424.

The foregoing examples are merely used to describe this application, and are not intended to constitute a limitation. During specific implementation, the first control operation is not limited to the foregoing click to select, box select, or drag operation, and may be another operation.

According to the pointing remote control method provided in this embodiment of this application, the display device 100 may receive, by using an infrared receiver array or an infrared receiver frame, a patterned infrared signal sent by the remote control device 200. The display device 100 may determine a pointing position of the remote control device 200 on the display device 100 based on a projection of the patterned infrared signal on the infrared receiver array or the infrared receiver frame. In this way, the remote control device 200 may accurately point to a position in which a user expects to perform an operation on the display screen of the display device 100. In addition, it is also convenient for a user to perform a touch type interactive operation (such as click to select, box select, touch and hold, and drag) on the display device 100 by using a pointing remote control device 200 at a distance.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A display device, comprising:
   a processor;
   a display screen; and
   a plurality of infrared receivers arranged into an infrared receiver array, wherein the infrared receiver array is coupled to the display screen and is configured to receive a patterned infrared signal sent by a remote control device, and wherein the patterned infrared signal comprises a circular ring infrared signal;
   wherein the processor is configured to:
      obtain a projection pattern of the patterned infrared signal on the display screen;
   wherein the projection pattern comprises a circular ring projection pattern or an oval ring projection pattern, and energy in different rings in the circular ring infrared signal is different;
      obtain positions of M receiving points covered by the circular ring projection pattern or the oval ring projection pattern on the infrared receiver array, wherein M is a positive integer;
      determine circular rings corresponding to the M receiving points by using the positions of the M receiving points as centers and using outer ring radiuses and inner ring radiuses that correspond to signal strength of the circular ring infrared signal received by the M receiving points; and
      determine an overlapping area of M circular rings based on the circular rings respectively corresponding to the M receiving points, and determine a central position of the overlapping area as a pointing position; and
   wherein the display screen is configured to display a prompt mark in the pointing position of the display screen, wherein the prompt mark prompts a user with the pointing position of the remote control device on the display screen.

2. The display device according to claim 1, further comprising:
   a wireless communication interface, configured to receive control information that corresponds to a first button and that is sent by the remote control device; and
   wherein the processor is further configured to:
      determine a first control operation based on the control information corresponding to the first button and the pointing position; and
      perform the first control operation.

3. The display device according to claim 2, wherein the wireless communication interface is configured to:
   receive the control information that corresponds to the first button and that is sent by the remote control device by using the patterned infrared signal.

4. The display device according to claim 2, wherein the wireless communication interface is configured to:
   receive the control information that corresponds to the first button and that is sent by the remote control device through Bluetooth.

5. A method, comprising:
   receiving, by a display device using a plurality of infrared receivers, a patterned infrared signal sent by a remote control device, wherein the plurality of infrared receivers are arranged into an infrared receiver array, the infrared receiver array is coupled to a display screen, and the patterned infrared signal comprises a circular ring infrared signal;
   obtaining, by the display device, a projection pattern of the patterned infrared signal on the display screen, wherein the projection pattern comprises a circular ring projection pattern or an oval ring projection pattern, and energy in different rings in the circular ring infrared signal is different;
   obtaining, by the display device, positions of M receiving points covered by the circular ring projection pattern or the oval ring projection pattern on the infrared receiver array, wherein M is a positive integer;
   determining, by the display device, circular rings corresponding to the M receiving points by using the positions of the M receiving points as centers and using outer ring radiuses and inner ring radiuses that correspond to signal strength of the circular ring infrared signal received by the M receiving points;

determining, by the display device, an overlapping area of M circular rings based on the circular rings respectively corresponding to the M receiving points, and determining a central position of the overlapping area as a pointing position; and displaying, by the display device, a prompt mark in the pointing position of the display screen, wherein the prompt mark prompts a user with the pointing position of the remote control device on the display screen.

6. The method according to claim 5, further comprising:

receiving, by the display device, control information that corresponds to a first button and that is sent by the remote control device;

determining, by the display device, a first control operation based on the control information corresponding to the first button and the pointing position; and performing, by the display device, the first control operation.

7. The method according to claim 6, wherein receiving, by the display device, the control information that corresponds to the first button and that is sent by the remote control device comprises:

receiving, by the display device, the control information that corresponds to the first button and that is sent by the remote control device by using the patterned infrared signal.

8. The method according to claim 6, wherein receiving, by the display device, the control information that corresponds to the first button and that is sent by the remote control device comprises:

receiving, by the display device, the control information that corresponds to the first button and that is sent by the remote control device through Bluetooth.

9. The method according to claim 5, wherein the plurality of infrared receivers are arranged around the display screen to form an infrared receiver frame.

10. A chip system, applied to a display device, wherein the chip system comprises:

a processor, configured to:

obtain a projection pattern of a patterned infrared signal on a display screen of the display device that is sent by a remote control device and that is received by a plurality of infrared receivers of the display device, wherein the plurality of infrared receivers is arranged into an infrared receiver array, and the infrared receiver array is coupled to the display screen and is configured to receive a patterned infrared signal sent by a remote control device, and wherein the patterned infrared signal comprises a circular ring infrared signal;

obtain a projection pattern of the patterned infrared signal on the display screen, wherein the projection pattern comprises a circular ring projection pattern or an oval ring projection pattern, and energy in different rings in the circular ring infrared signal is different;

obtain positions of M receiving points covered by the circular ring projection pattern or the oval ring projection pattern on the infrared receiver array, wherein M is a positive integer;

determine circular rings corresponding to the M receiving points by using the positions of the M receiving points as centers and using outer ring radiuses and inner ring radiuses that correspond to signal strength of the circular ring infrared signal received by the M receiving points;

determine an overlapping area of M circular rings based on the circular rings respectively corresponding to the M receiving points, and determine a central position of the overlapping area as a pointing position; and, indicate to the display screen to display a prompt mark in the pointing position, wherein the prompt mark prompts a user with the pointing position of the remote control device on the display screen.

* * * * *